United States Patent
Bairo

(10) Patent No.: US 12,490,539 B2
(45) Date of Patent: Dec. 2, 2025

(54) SEMICONDUCTOR DEVICE AND ELECTRONIC APPARATUS

(71) Applicant: SONY SEMICONDUCTOR SOLUTIONS CORPORATION, Kanagawa (JP)

(72) Inventor: Masaaki Bairo, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 450 days.

(21) Appl. No.: 17/999,096

(22) PCT Filed: Apr. 15, 2021

(86) PCT No.: PCT/JP2021/015626
§ 371 (c)(1),
(2) Date: Nov. 17, 2022

(87) PCT Pub. No.: WO2021/241058
PCT Pub. Date: Dec. 2, 2021

(65) Prior Publication Data
US 2023/0178577 A1 Jun. 8, 2023

(30) Foreign Application Priority Data
May 29, 2020 (JP) .................. 2020-094864

(51) Int. Cl.
*H10F 39/00* (2025.01)
*H01L 23/00* (2006.01)
*H01L 23/522* (2006.01)

(52) U.S. Cl.
CPC ....... *H10F 39/809* (2025.01); *H01L 23/5223* (2013.01); *H01L 24/08* (2013.01); *H10F 39/811* (2025.01); *H01L 2224/08145* (2013.01)

(58) Field of Classification Search
CPC ...... H10F 39/811; H10F 39/018; H10F 39/12; H10F 39/18; H10F 39/199; H10F 39/803;
(Continued)

(56) References Cited

U.S. PATENT DOCUMENTS

2011/0050969 A1  3/2011  Nishihara
2011/0234830 A1  9/2011  Kiyota
(Continued)

FOREIGN PATENT DOCUMENTS

EP  2302905 A1  3/2011
EP  3869563 A   8/2021
(Continued)

OTHER PUBLICATIONS

International Search Report and Written Opinion of PCT Application No. PCT/JP2021/015626, issued on Jun. 29, 2021, 09 pages of ISRWO.

*Primary Examiner* — Tucker J Wright
(74) *Attorney, Agent, or Firm* — CHIP LAW GROUP

(57) ABSTRACT

Provided is a semiconductor device capable of improving a capacitance density of a capacitive element without decreasing an operating voltage. The semiconductor device includes: a first semiconductor substrate including a first capacitive element portion including at least one capacitive element; a second semiconductor substrate stacked with respect to the first semiconductor substrate; and a second capacitive element portion formed by a metal bonding portion provided on a bonding surface between the first semiconductor substrate and the second semiconductor substrate. The first and second capacitive element portions are connected to each other in parallel.

12 Claims, 27 Drawing Sheets

(58) Field of Classification Search
CPC ....... H10F 39/8037; H01L 2224/08145; H01L 23/5223; H04N 25/70; H04N 25/76
See application file for complete search history.

(56) References Cited

U.S. PATENT DOCUMENTS

| | | | |
|---|---|---|---|
| 2014/0042582 A1 | 2/2014 | Kondo | |
| 2021/0296283 A1* | 9/2021 | Huang | ................ H01L 25/0657 |
| 2021/0343776 A1 | 11/2021 | Nagahama | |

FOREIGN PATENT DOCUMENTS

| | | | |
|---|---|---|---|
| JP | 2005-183739 A | 7/2005 |
| JP | 2011-071958 A | 4/2011 |
| JP | 2011204797 A | 10/2011 |
| JP | 2011-254088 A | 12/2011 |
| JP | 2013-034179 A | 2/2013 |
| JP | 2014036306 A | 2/2014 |
| JP | 2016-025331 A | 2/2016 |
| JP | 2018-037626 A | 3/2018 |
| JP | 2018-148528 A | 9/2018 |
| WO | WO-2020080327 A1 | 4/2020 |

\* cited by examiner

FIG. 16
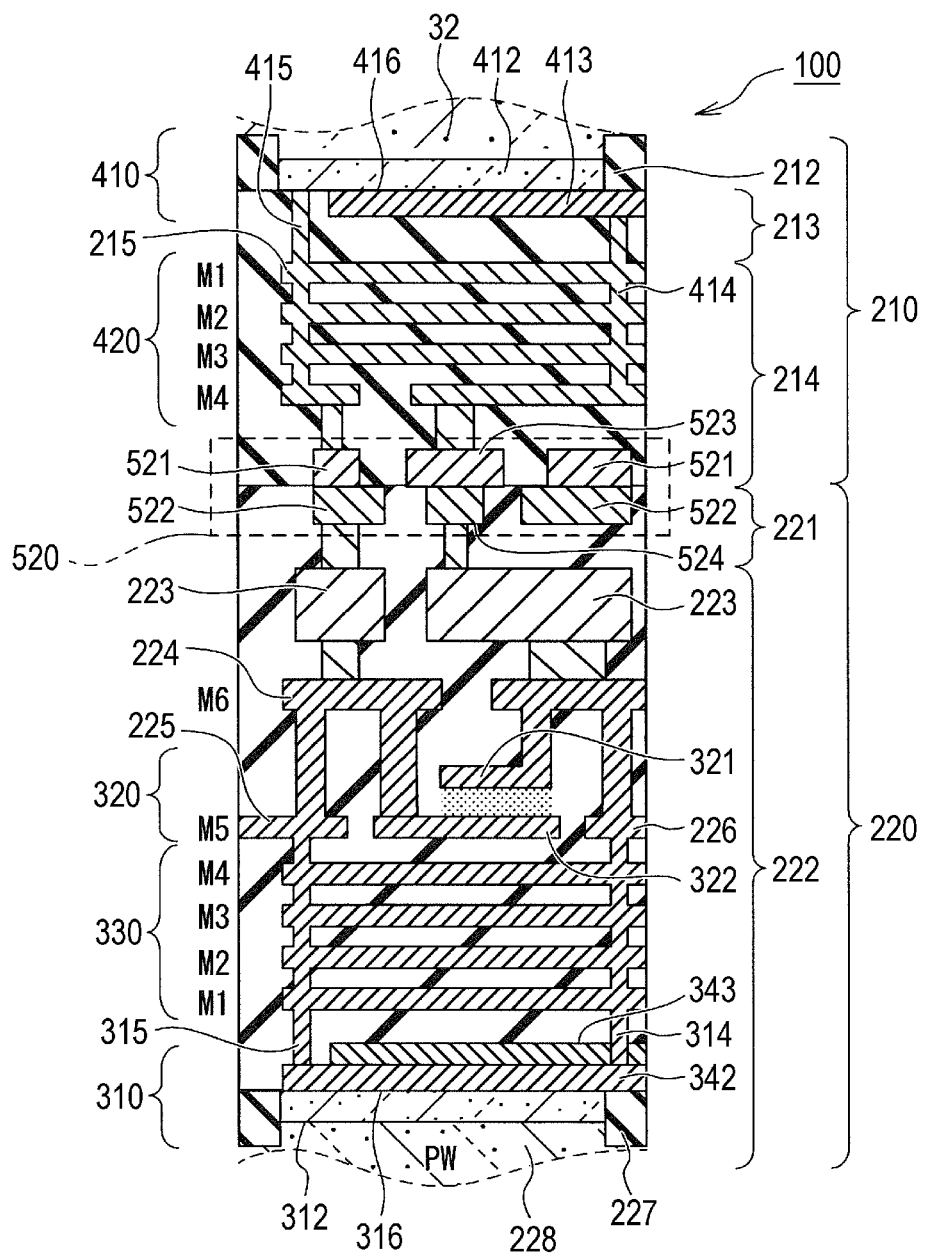
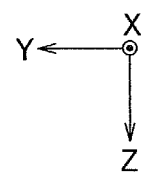

FIG. 20

| POSITION | Device | COMBINATION OF CAPACITIVE ELEMENTS TO BE STACKED | | | | | |
|---|---|---|---|---|---|---|---|
| SENSOR UNIT | ACCUMULATION TYPE MOS CAPACITIVE ELEMENT | | | | ● | ● | ● |
| | MOM CAPACITIVE ELEMENT | | | | | ● | ● |
| BONDING PORTION | BONDING PORTION CAPACITIVE ELEMENT | | | | | | ● |
| PERIPHERAL CIRCUIT UNIT | ACCUMULATION TYPE MOS CAPACITIVE ELEMENT | | ● | ● | ● | ● | ● |
| | MOM CAPACITIVE ELEMENT | ● | | ● | ● | ● | ● |
| | MIM CAPACITIVE ELEMENT | | ● | ● | ● | ● | ● |
| | MULTIPLICATION FACTOR OF CAPACITANCE VALUE [a.u.] | 1.0 | 5.1 | 6.1 | 8.4 | 9.4 | 10.0 |

SEMICONDUCTOR DEVICE AND ELECTRONIC APPARATUS

CROSS REFERENCE TO RELATED APPLICATIONS

This application is a U.S. National Phase of International Patent Application No. PCT/JP2021/015626 filed on Apr. 15, 2021, which claims priority benefit of Japanese Patent Application No. JP 2020-094864 filed in the Japan Patent Office on May 29, 2020. Each of the above-referenced applications is hereby incorporated herein by reference in its entirety.

TECHNICAL FIELD

The technology (present technology) according to the present disclosure relates to a semiconductor device and an electronic apparatus including the semiconductor device.

BACKGROUND ART

As a solid-state imaging device that captures an image, for example, a charge coupled device (CCD) image sensor and a complementary metal oxide semiconductor (CMOS) image sensor are provided. However, a CMOS image sensor that can be manufactured in an existing CMOS process without requiring special capital investment has attracted attention, and has been rapidly adopted in a camera system or a monitoring system built in a mobile phone.

As the CMOS image sensors have been applied to various fields, miniaturization and high performance have been required. Therefore, in order to achieve the requirements, a stacked CMOS image sensor has been proposed in which a sensor unit and a peripheral circuit unit are respectively formed on different substrates (wafers), and these wafers are bonded using the WoW technology to have a function as an image sensor (Patent Document 1).

In the stacked CMOS image sensor, incident light is received by the sensor unit, and is photoelectrically converted by a photodiode in the sensor unit. An electric charge generated by the photodiode is analog-to-digital converted into a pixel signal by the peripheral circuit unit. Here, in the peripheral circuit unit, a coupling capacitor for blocking a DC component of an input signal is used.

The coupling capacitor can be miniaturized as the capacitance density (capacitance value per unit area) of a capacitive element to be used increases, but the bias dependence of the capacitance value is required to be small. This is because when the bias dependence of the capacitance value is large, for example, a pixel signal and a reference signal, which are transmitted to a gate electrode of a differential input transistor of a comparator, is distorted, and the accuracy of the analog-to-digital conversion significantly deteriorates.

Furthermore, the CMOS process for manufacturing a peripheral circuit unit has been shifting to a fine process. However, even when shifting to the fine process, a logic circuit that processes a digital signal and includes a MOSFET such as an SRAM or a logical circuit can be miniaturized, but it is not easy to miniaturize an analog circuit that processes an analog signal output from the sensor unit. The reason for this is that although the image sensor has better performance as the maximum electric charge that can be read by the sensor unit is greater, the detected electric charge is converted into a voltage and transferred through the circuit, and thus, even when the manufacturing process is fined, as long as the performance at the maximum electric charge is maintained, the operating voltage of the device including the analog circuit that receives the signal of the sensor unit does not decrease, and the device itself cannot be miniaturized according to the scaling rule.

Note that as a capacitive element formed on a semiconductor substrate, use of a MOS capacitive element disclosed in Patent Document 2, a comb-shaped wiring capacitive element disclosed in Patent Document 3, and a metal insulator metal (MIM) capacitive element disclosed in Patent Document 4 has been proposed.

The capacitance density ($\varepsilon/d$) of the MOS capacitive element and the capacitance density ($\varepsilon/d$) of the MIM capacitive element are substantially determined by the film thickness (d) of a gate insulating film and the dielectric constant ($\varepsilon$) of the gate insulating film. Increasing the dielectric constant as a method for increasing the capacitance density increases the manufacturing cost, and thus a method of reducing the film thickness is generally used. However, when the film thickness of the insulating film is reduced without decreasing the operating voltage of the capacitive element, time dependent dielectric breakdown (TDDB), which is the life of the insulating film, deteriorates, and the product life is shortened.

Furthermore, the comb-shaped wiring capacitive element is an element in which a parasitic capacitance formed by opposing wirings is utilized as a capacitive element, but in order to increase the capacitance density, it is necessary to narrow a wiring space. However, when the wiring space is narrowed without decreasing the operating voltage of the capacitive element, the TDDB of the insulating film between the wiring spaces deteriorates and the product life is shortened. In addition, as the fining of the process proceeds, a low-K film having a smaller dielectric constant is used as the insulating film covering a wiring layer, which also causes the capacitance value of the comb-shaped wiring capacitive element not to increase.

In addition, with respect to the MIM capacitive element as disclosed in Patent Document 4, similarly to the MOS capacitive element described above, the reliability of the insulating film becomes an issue, and the capacitance density cannot be improved.

CITATION LIST

Patent Document

Patent Document 1: Japanese Patent Application Laid-Open No. 2018-148528
Patent Document 2: Japanese Patent Application Laid-Open No. 2011-254088
Patent Document 3: Japanese Patent Application Laid-Open No. 2005-183739
Patent Document 4: Japanese Patent Application Laid-Open No. 2018-37626

SUMMARY OF THE INVENTION

Problems to be Solved by the Invention

As described above, there is a strong demand for a technique for dramatically increasing the capacitance density of the capacitive element without decreasing the operating voltage of the capacitive element.

The present disclosure has been made in view of such circumstances, and an object of the present disclosure is to provide a semiconductor device capable of improving the capacitance density of a capacitive element without decreasing the operating voltage, and an electronic apparatus.

Solutions to Problems

According to an aspect of the present disclosure, there is provided a semiconductor device including: a first semiconductor substrate including a first capacitive element portion including at least one capacitive element; a second semiconductor substrate stacked with respect to the first semiconductor substrate; and a second capacitive element portion formed by a metal bonding portion provided on a bonding surface between the first semiconductor substrate and the second semiconductor substrate, in which the first and second capacitive element portions are connected to each other in parallel.

According to another aspect of the present disclosure, there is provided an electronic apparatus including a semiconductor device, the semiconductor device including: a first semiconductor substrate including a first capacitive element portion including at least one capacitive element; a second semiconductor substrate stacked with respect to the first semiconductor substrate; and a second capacitive element portion formed by a metal bonding portion provided on a bonding surface between the first semiconductor substrate and the second semiconductor substrate, in which the first and second capacitive element portions are connected to each other in parallel.

BRIEF DESCRIPTION OF DRAWINGS

FIG. 16 is a cross-sectional view of a solid-state imaging device according to a second modification example of the second embodiment.

FIG. 20 is a table illustrating an example of types of capacitive elements arranged in each chip and an increase rate of a capacitance value in a case where the capacitive elements are connected in parallel in the second embodiment.

MODE FOR CARRYING OUT THE INVENTION

Figure 1:
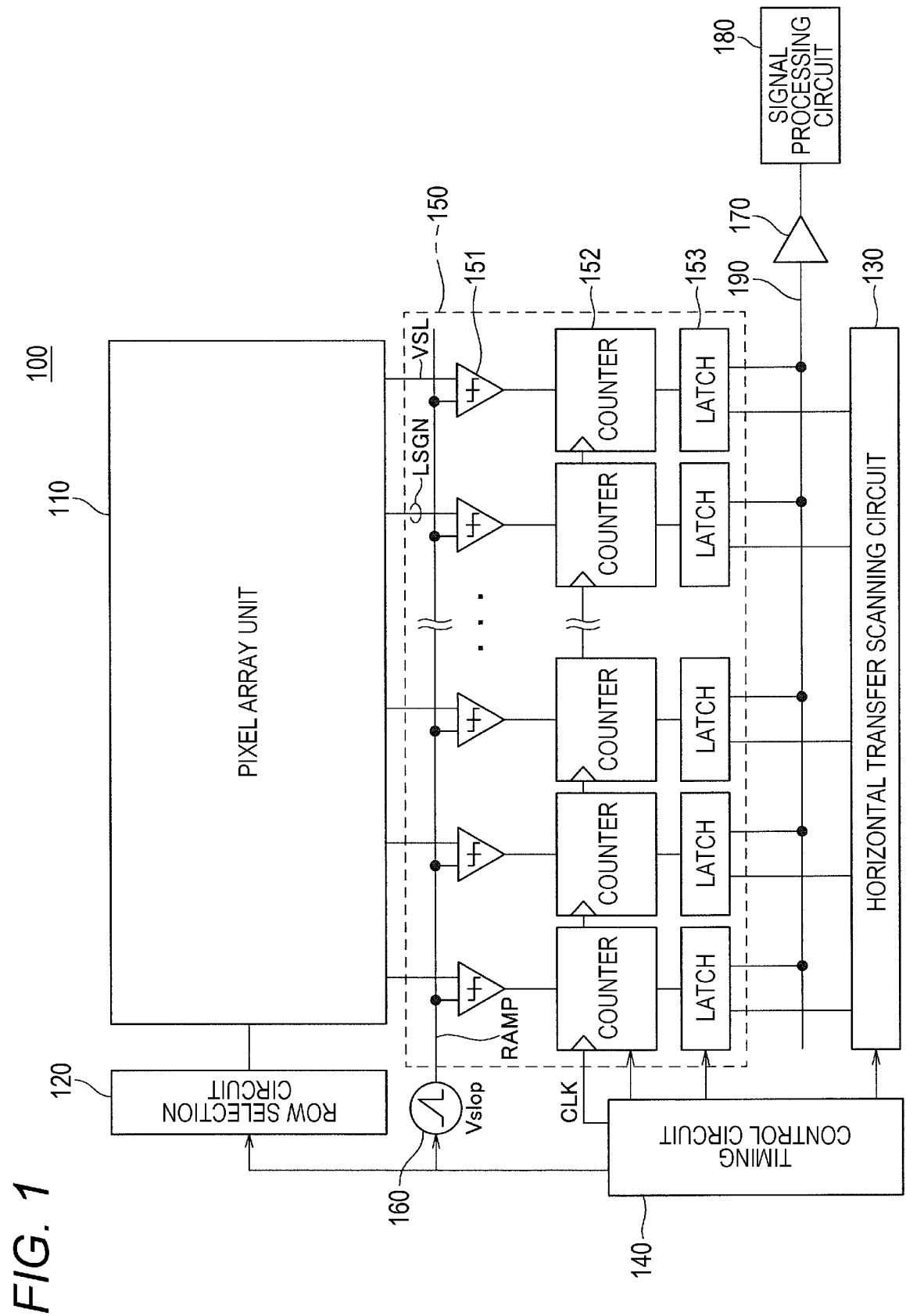
FIG. 1 is an equivalent circuit diagram of a solid-state imaging device according to a first embodiment.

Hereinafter, embodiments of the present disclosure will be described with reference to the drawings. In the following description, the same or similar members are denoted by the same or similar reference numerals, and the overlapping description will be omitted. However, it should be noted that the drawings are schematic, and the relationship between the thickness and the plane dimension, the thickness ratio of each device and each member, and the like are different from actual ones. Therefore, a specific thickness and a specific dimensions should be determined in consideration of the following description. Furthermore, it is needless to say that portions having different dimensional relationships and ratios are included in the drawings.

In the present specification, "first conductivity type" means one of p-type and n-type, and "second conductivity type" means one of p-type and n-type, different from the "first conductivity type". Furthermore, "+" or "−" added to "n" or "p" means a semiconductor region having a relatively higher impurity density or a relatively lower impurity density than a semiconductor region to which "+" or "−" is not added. However, even when the same "n"s is added to the semiconductor regions, it does not mean that the impurity densities of the respective semiconductor regions are exactly the same.

Furthermore, the definitions of directions such as up and down in the following description are merely definitions for convenience of description, and do not limit the technical idea of the present disclosure. For example, it is needless to say that when an object is rotated by 90° to observed, upper and lower sides are converted into right and left sides to be read, and when the object is rotated by 180° to observed, the upper and lower sides are inverted to be read.

Note that the effects described in the present specification are merely examples and are not limited, and other effects may be provided.

First Embodiment

<Overall Configuration of Solid-State Imaging Device>

As the first embodiment, a case where a semiconductor device according to the present technology is applied to a solid-state imaging device (CMOS image sensor) will be described as an example. As illustrated in FIG. 1, a solid-state imaging device 100 according to the first embodiment includes a pixel array unit 110 and a peripheral circuit that reads an electric signal from the pixel array unit 110 and performs predetermined signal processing.

The solid-state imaging device 100 according to the first embodiment includes, as the peripheral circuit, a row selection circuit 120 that controls a row address and row scanning, a horizontal transfer scanning circuit 130 that controls a column address and column scanning, and a timing control circuit 140 that generates an internal clock as a control circuit. Moreover, the solid-state imaging device 100 according to the first embodiment includes, as the peripheral circuit, an ADC group 150, a digital-to-analog conversion device (DAC) 160 as a ramp signal generator, an amplifier circuit 170, a signal processing circuit 180, and a horizontal transfer line 190. Moreover, the solid-state imaging device 100 according to the first embodiment includes a DC power supply circuit (not illustrated) as the peripheral circuit.

Figure 2:
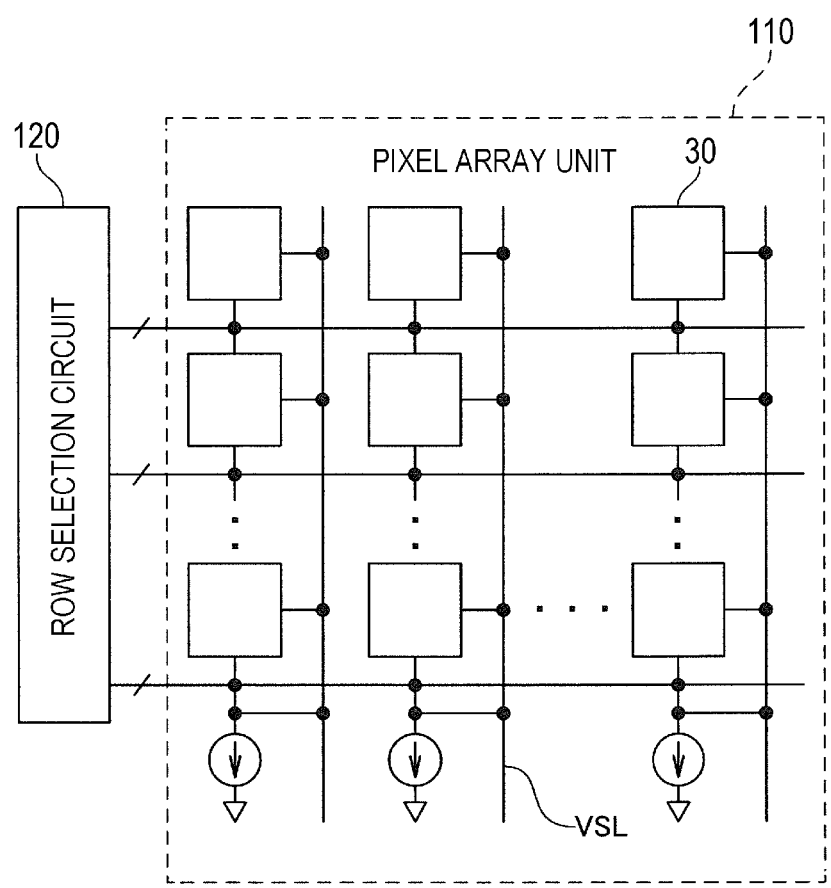
FIG. 2 is an equivalent circuit diagram of a pixel array unit according to the first embodiment.
Figure 3:
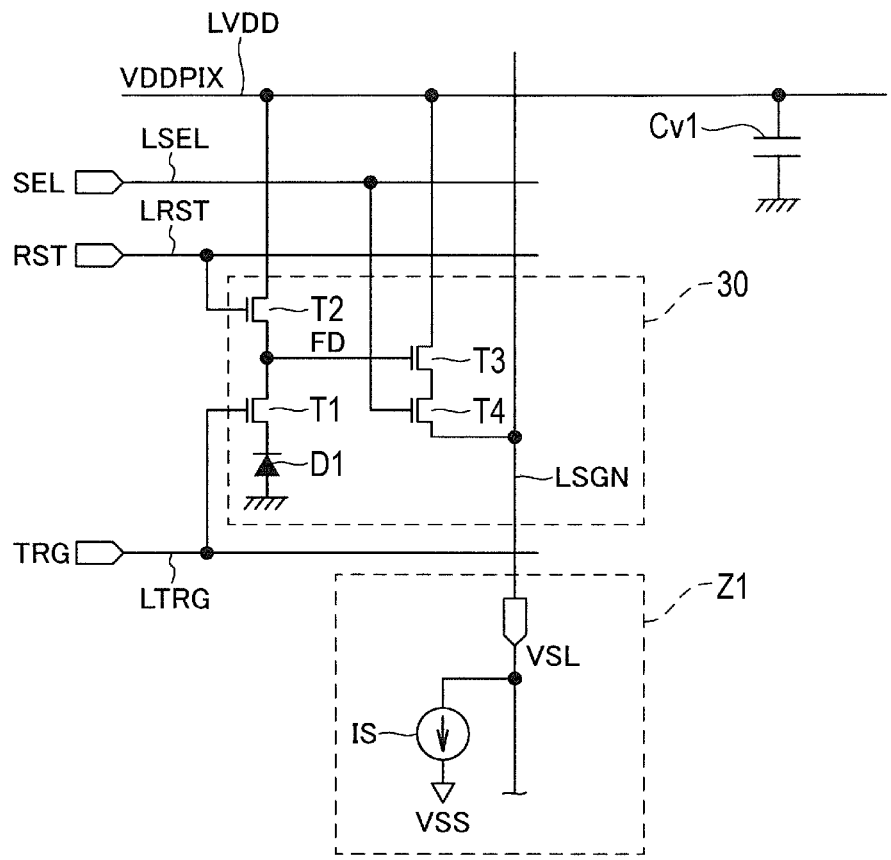
FIG. 3 is an equivalent circuit diagram of a pixel according to the first embodiment.

As illustrated in FIG. 2, the pixel array unit 110 includes a large number of pixels 30 arranged in an array (matrix). For example, as illustrated in FIG. 3, each of the pixels 30 includes a photoelectric conversion element D1 including, for example, a photodiode (PD). The pixel 30 includes four transistors of a transfer transistor T1, a reset transistor T2, an amplification transistor T3, and a selection transistor T4 as active elements with respect to the photoelectric conversion element D1. Furthermore, in order to extract a signal from the pixel 30 as a voltage fluctuation, a constant current source load Z1 is connected to a vertical signal line (LSGN) shared by the pixel 30 in a column direction.

The photoelectric conversion element D1 photoelectrically converts incident light into electric charges (electrons in this case) corresponding to the amount of the incident light. The transfer transistor T1 as a transfer element is connected between the photoelectric conversion element D1 and a floating diffusion FD as an input node, and a transfer signal TRG as a control signal is provided to a gate (transfer gate) of the transfer transistor T1 through a transfer control line LTRG. Therefore, the transfer transistor T1 transfers the electrons photoelectrically converted by the photoelectric conversion element D1 to the floating diffusion FD.

The reset transistor T2 is connected between a power supply line LVDD to which a power supply voltage VDD is supplied and the floating diffusion FD, and a reset signal RST as a control signal is provided to a gate of the reset transistor T2 through a reset control line LRST. Therefore, the reset transistor T2 as a reset element resets the potential of the floating diffusion FD to the potential of the power supply line LVDD.

A gate of the amplification transistor T3 as an amplification element is connected to the floating diffusion FD. That is, the floating diffusion FD functions as an input node of the amplification transistor T3 as an amplification element. The amplification transistor T3 and the selection transistor T4 are connected in series between the power supply line LVDD to which the power supply voltage VDD is supplied and a signal line LSGN. As described above, the amplification transistor T3 is connected to the signal line LSGN via the selection transistor T4, and configures a source follower with a constant current source IS outside the pixel portion. Then, a selection signal SEL, which is a control signal corresponding to an address signal, is applied to a gate of the selection transistor T4 through a selection control line LSEL, and the selection transistor T4 is turned on. When the selection transistor T4 is turned on, the amplification transistor T3 amplifies the potential of the floating diffusion FD and outputs a voltage corresponding to the potential of the floating diffusion FD to the signal line LSGN. A voltage output from each pixel is output to the ADC group 150 through the signal line LSGN. For example, since the gates of the transfer transistor T1, the reset transistor T2, and the selection transistor T4 are connected in units of rows, these operations are simultaneously performed for each pixel of one row.

The reset control line LRST, the transfer control line LTRG, and the selection control line LSEL, which are wired in the pixel array unit 110, are wired as a set in units of rows of the pixel array. M reset control lines LRST, M transfer control lines LTRG, and M selection control lines LSEL are provided. The reset control line LRST, the transfer control line LTRG, and the selection control line LSEL are driven by the row selection circuit 120.

Meanwhile, a decoupling capacitor CV1 is connected between the power supply line LVDD and a ground (GND). The decoupling capacitor CV1 removes a noise component mixed in a DC power supply voltage supplied to drive the circuit. The total area of the decoupling capacitor CV1 may exceed 10 mm$^2$, and the proportion of the decoupling capacitor CV1 in the chip area of the stacked CMOS image sensor is great.

Figure 4:
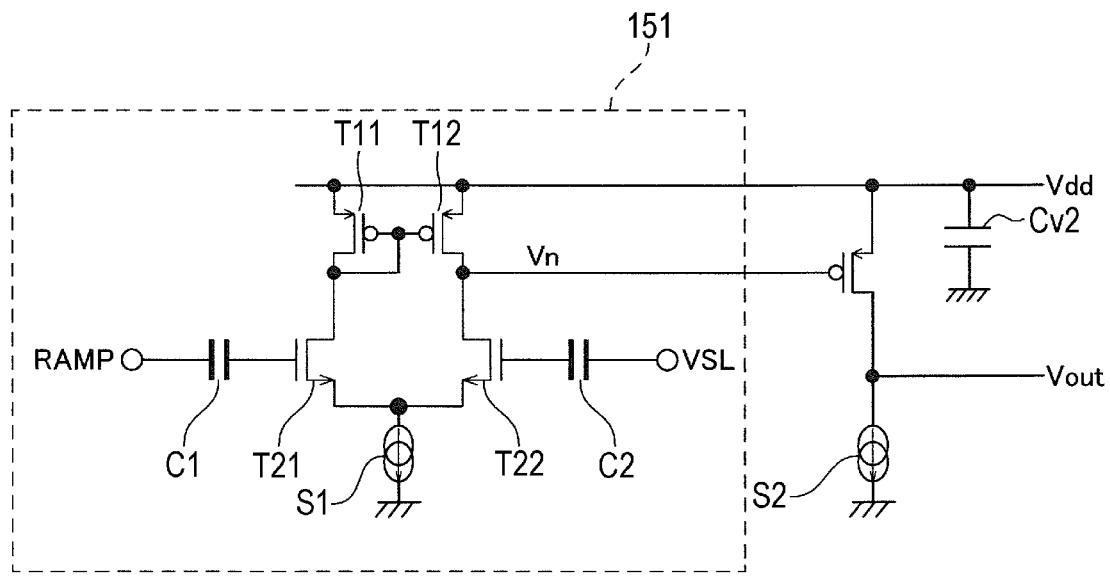
FIG. 4 is an equivalent circuit diagram of a comparator according to the first embodiment.

In the ADC group 150 illustrated in FIG. 1, a plurality of single-slope ADCs including a comparator 151, a counter 152, and a latch 153 are arranged. For example, as illustrated in FIG. 4, the comparator 151 includes a differential amplifier circuit including differential input transistors T21 and T22 constituting a differential pair and active load transistors T11 and T12 including a current mirror circuit. The differential input transistors T21 and T22 are configured by n-type MOSFETs (hereinafter, also referred to as "nMOS"), and the active load transistors T11 and T12 are configured by p-type MOSFETs (hereinafter, also referred to as "pMOS"). In the peripheral circuit of the solid-state imaging device according to the first embodiment, the active load transistors T11 and T12 and the differential input transistors T21 and T22 are noise sources.

Sampling capacitors C1 and C2 are connected in series to two differential input terminals of the comparator 151, respectively. The comparator 151 compares a reference voltage (DAC side input) Vslop, which is a ramp waveform obtained by changing the reference voltage generated by a DAC 160 stepwise, with an analog signal (vertical signal line (VSL) side input) obtained from a pixel via the vertical signal line LSGN for each row line.

The counter 152 illustrated in FIG. 1 counts a comparison time of the comparator 151. The ADC group 150 has an n-bit digital signal conversion function, is disposed for each vertical signal line (column line), and configures a column-parallel ADC block. The output of each latch 153 is connected to, for example, the horizontal transfer line 190 having a 2n-bits width. Then, 2n amplifier circuits 170 and signal processing circuits 180, which correspond to the horizontal transfer line 190, are disposed.

The sampling capacitors C1 and C2 illustrated in FIG. 4 can be miniaturized as the capacitance density (capacitance value per unit area) of a capacitive element to be used increases, but the bias dependence of the capacitance value is required to be small. This is because when the bias dependence of the capacitance value is large, for example, a pixel signal and a reference signal, which are transmitted to a gate electrode of a differential input transistor of a comparator, is distorted, and the accuracy of the analog-to-digital conversion significantly deteriorates. Furthermore, with respect to the comparator 151, a decoupling capacitor CV2 is connected between a power supply line Vdd and the ground (GND).

Therefore, in the first embodiment of the present disclosure, even when the solid-state imaging device 100 is miniaturized, a capacitive element having a small bias dependence of the capacitance value and a large capacitance density without decreasing the operating voltage is realized.

Figure 5:
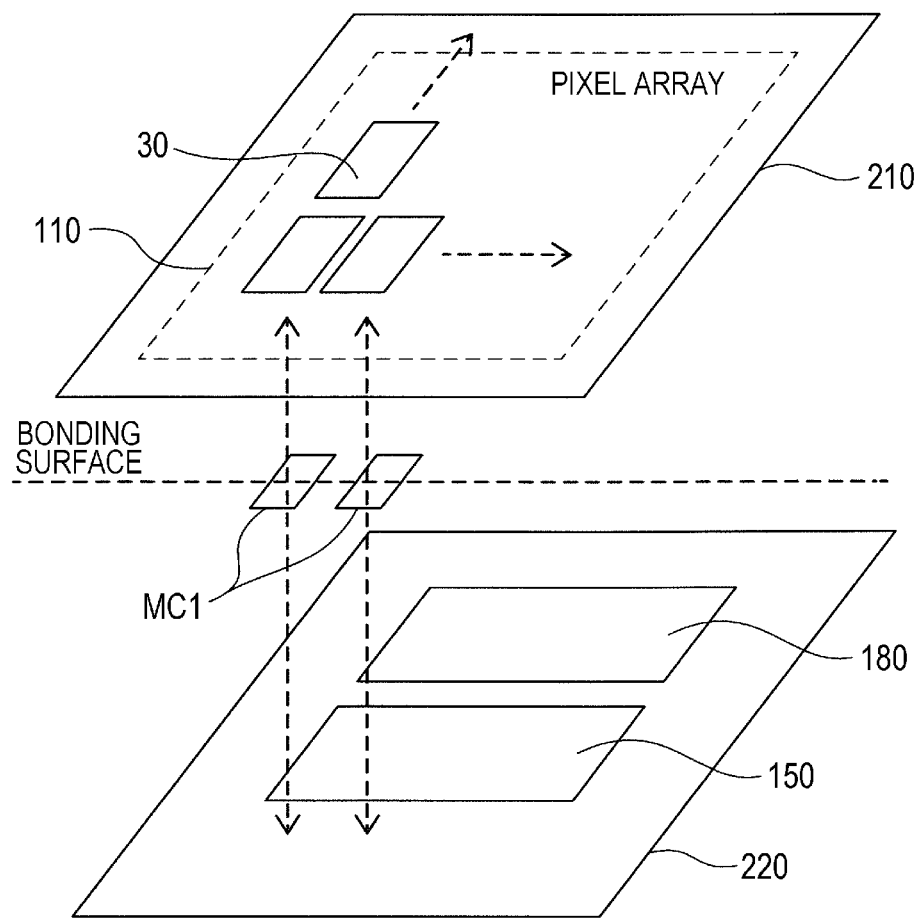
FIG. 5 is a schematic view of an upper semiconductor substrate and a lower semiconductor substrate according to the first embodiment.

FIG. 5 is an arrangement view of each circuit on a semiconductor chip constituting the solid-state imaging device 100 according to the first embodiment. The solid-state imaging device 100 according to the first embodiment includes a stacked image sensor in which two semiconductor chips of an upper semiconductor substrate 210 and a lower semiconductor substrate 220 are stacked, and parts of wiring of the upper and lower chips are electrically connected by a metal bonding portion MC1 such as a through-silicon via (TSV). In this case, the pixel array unit 110 in which the pixels 30 are arranged in a matrix is mounted on the upper semiconductor substrate 210, and the peripheral circuits such as the ADC group 150 and the signal processing circuit 180 other than the pixel array unit 110 are mounted on the lower semiconductor substrate 220.

Figures 6A, 6B:
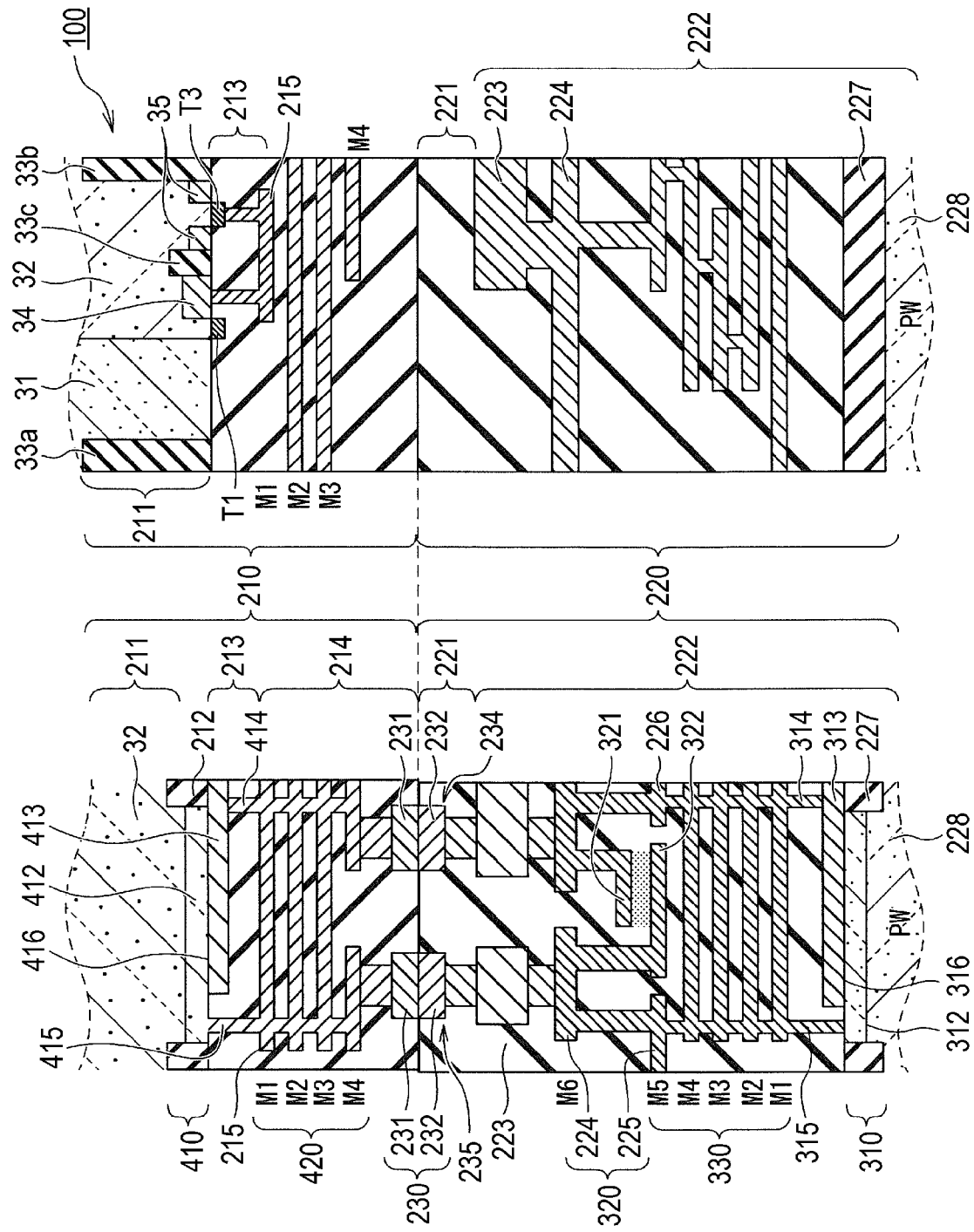
FIGS. 6A and 6B are cross-sectional views of a solid-state imaging device according to the first embodiment.

FIGS. 6A and 6B are cross-sectional views of the solid-state imaging device 100 according to the first embodiment. FIG. 6A illustrates the outside of the pixel, and FIG. 6B illustrates the inside of the pixel.

In FIGS. 6A and 6B, the upper semiconductor substrate 210 includes a photoelectric conversion layer 211, an inter-layer insulating film 213, and a wiring layer 214 from the top. The photoelectric conversion layer 211 is a layer in which a photodiode (PD) 31 is formed, the photoelectric conversion layer generating an electric charge corresponding to the amount of incident light by photoelectric conversion. The PD 31 is electrically separated by element separation portions 33a and 33b formed in the photoelectric conversion layer 211 for each pixel 30. Furthermore, a p-type well 32 is formed in a region in which the PD 31 is not formed in the photoelectric conversion layer 211. A FD 34 and an n-type diffusion layer 35 are formed in the p-type well 32. Note that as illustrated in FIG. 6A, only the p-type well 32 is provided outside the pixel 30.

The electric charge generated by the PD 31 is transferred to the FD 34 via the transfer transistor T1 provided in the inter-layer insulating film 213. The amplification transistor T3 provided in the inter-layer insulating film 213 is located near the n-type diffusion layer 35. Element separation portions 33b and 33c are formed at both ends of the n-type diffusion layer 35. Therefore, the FD 34 and the pixel transistor T3 are electrically separated by the n-type diffusion layer 35 and the element separation portions 33b and 33c.

The wiring layer 214 includes wiring (M1 to M4) 215 formed by being stacked in a plurality of layers. The transfer transistor T1, the reset transistor T2, the amplification transistor T3, and the selection transistor T4, which constitute each pixel 30, are driven via the plurality of layers (M1 to M4) of the wiring 215 formed in the wiring layer 214. Furthermore, a metal bonding portion 231 made of copper (Cu) is provided in the wiring layer 214 to perform bonding with the lower semiconductor substrate 220.

On the other hand, the lower semiconductor substrate 220 includes an inter-layer insulating film 221 and a wiring layer 222 from the top. The wiring layer 222 includes entire wiring 223 and wiring (M1 to M6) 224 formed by being stacked in a plurality of layers. Furthermore, the inter-layer insulating film 221 is provided with a metal bonding portion 232 made of copper (Cu) for bonding to the metal bonding portion 231 of the upper semiconductor substrate 210.

In the solid-state imaging device 100 having the above-described configuration, light incident on the upper semiconductor substrate 210 is photoelectrically converted by the PD 31, and thus electric charge is generated. Then, the generated electric charge is output, as a pixel signal, to the ADC group 150 formed on the lower semiconductor substrate 220 through the signal line LSGN illustrated in FIG. 1 formed by the wiring (M1 to M4) 215 and the wiring (M1 to M6) 224 of the lower semiconductor substrate 220 via the amplification transistor T3.

Figure 7:
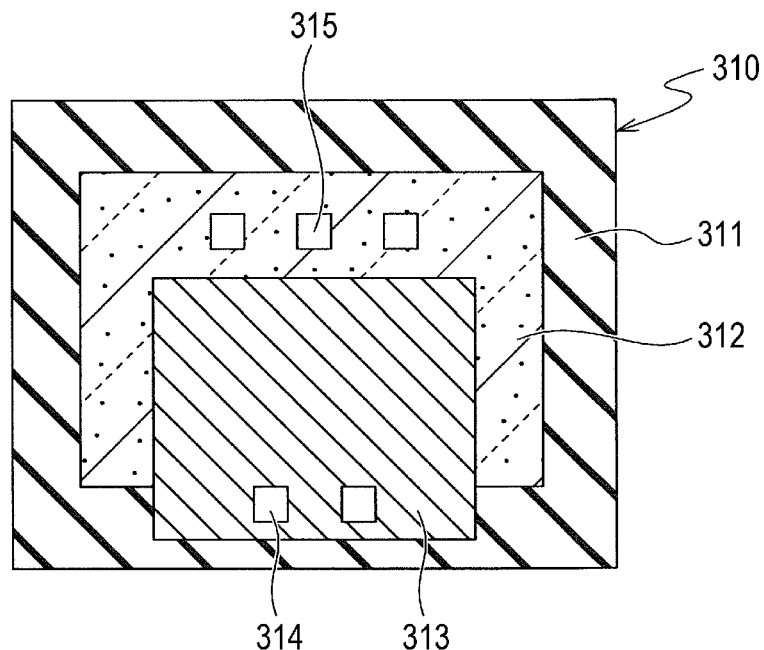
FIG. 7 is a plan view illustrating a configuration of an N+ accumulation type MOS capacitive element according to the first embodiment.

As illustrated in FIG. 6A, an N+ accumulation type MOS capacitive element 310 is disposed on the lower semiconductor substrate 220. In the MOS capacitive element 310, as illustrated in FIG. 7, when an electrode closer to the mounted lower semiconductor substrate 220 side is a lower electrode 312, for example, the lower electrode 312 mounted on an element separation portion 311 is an n-type diffusion layer formed in a p-type well 228, a gate insulating film 316 made of silicon oxide (SiO2) is formed on the lower electrode 312, and an upper electrode 313 made of n-type polycrystalline silicon is formed on the gate insulating film 316. The MOS capacitive element 310 is referred to as an N+ accumulation type MOS capacitor since electrons are accumulated on the surface of the lower electrode 312 during operation.

Figure 9:
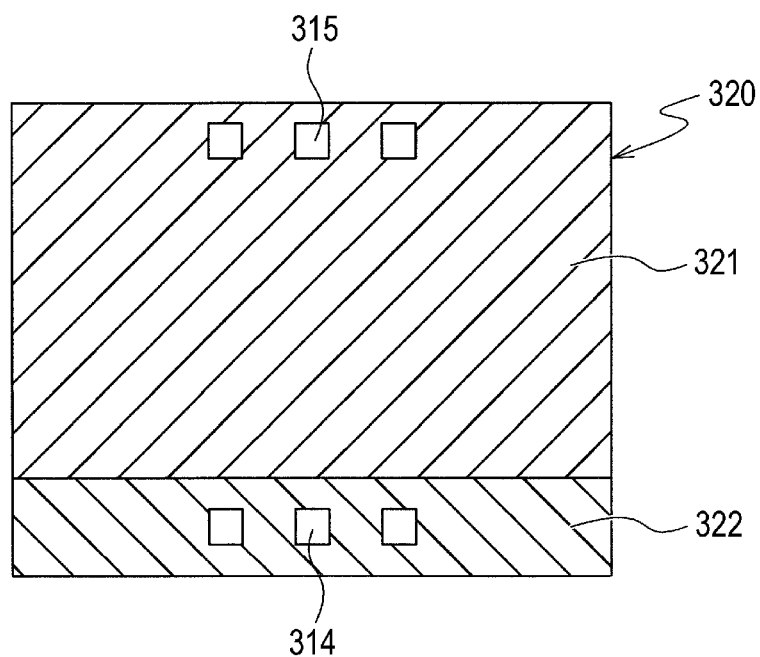
FIG. 9 is a plan view illustrating a configuration of an MIM capacitive element according to the first embodiment.

In a region in which the wiring (M1 to M6) 224, which is an upper layer in the same region in which the MOS capacitive element 310 is disposed, is formed, a metal insulator metal (MIM) capacitive element 320 formed by stacking a lower electrode 322, an insulating film (including a high-K material), and an upper electrode 321, which are located on a side close to the lower semiconductor substrate 220 side, is mounted. This insulating film is formed by a single layer film or a plurality of laminated films of any of $Ta_2O_2$, $Nb_2O_3$, $ZrO_2$, $HfO_2$, $La_2O_3$, $Pr_2O_3$, $AL_2O_3$, $SiO_2$, and SiN. As illustrated in FIG. 9, each of the lower electrode 322 and the upper electrode 321 is formed by a single layer film or a plurality of laminated films of any of Cu, Al, Ti, TiN, Ta, and TaN.

The wiring (M5) 224 is provided with a negative (minus) terminal 225 and a positive (plus) terminal 226.

Figure 8:
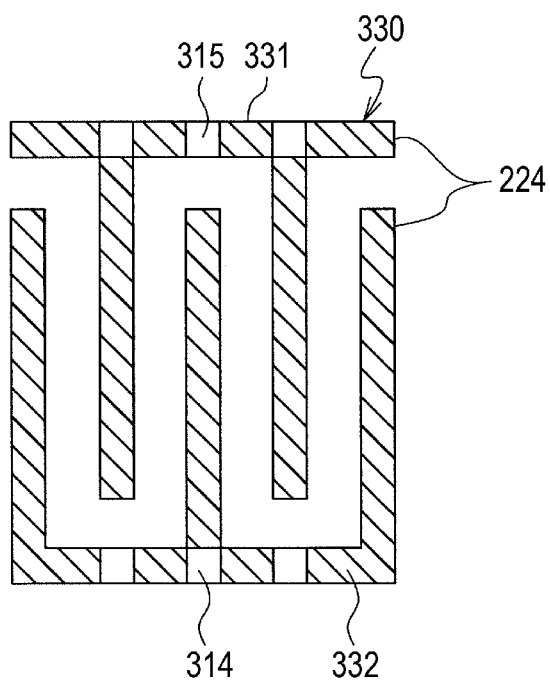
FIG. 8 is a plan view illustrating a configuration of an MOM capacitive element according to the first embodiment.

Furthermore, an MOM capacitive element 330 illustrated in FIG. 8 is formed on the lower semiconductor substrate 220 by using the wiring (M1 to M4) 224. The N+ accumulation type MOS capacitive element 310, the MIM capacitive element 320, and the MOM capacitive element 330 are connected in parallel. In this case, an upper electrode 331 of the MOM capacitive element 330 is connected to the lower electrode 312 of the MOS capacitive element 310 and the lower electrode 322 of the MIM capacitive element 320 via a via 315 and the wiring (M6) 224. Furthermore, a lower electrode 332 of the MOM capacitive element 330 is connected to the upper electrode 313 of the MOS capacitive element 310 and the upper electrode 321 of the MIM capacitive element 320 via a via 314 and the wiring (M6) 224. In this configuration, the capacitance density can be further increased.

The upper semiconductor substrate 210 includes the p-type well 32, the inter-layer insulating film 213, and the wiring layer 214 from the top. An N+ accumulation type MOS capacitive element 410 is disposed on the lower side of the upper semiconductor substrate 210. In the MOS capacitive element 410, a lower electrode 412 is an n-type diffusion layer formed in the p-type well 32, a gate insulating film 416 made of silicon oxide ($SiO_2$) is formed on the lower electrode 412, and an upper electrode 413 made of n-type polycrystalline silicon is formed on the gate insulating film 416.

In the same region in which the MOS capacitive element 410 is disposed, in a region in which the wiring (M1 to M4) 215 is formed, an MOM capacitive element 420 to be a comb-shaped wiring capacitive element is formed using the wiring (M1 to M4) 215. In this case, an upper electrode of the MOM capacitive element 420 is connected to the upper electrode 413 of the MOS capacitive element 410 via a via 414. Furthermore, a lower electrode of the MOM capacitive element 420 is connected to the lower electrode 412 of the MOS capacitive element 410 via a via 415.

Moreover, the upper electrode 413 of the MOS capacitive element 410 and the upper electrode of the MOM capacitive element 420 are connected to the upper electrode 313 of the MOS capacitive element 310 on the lower semiconductor substrate 220 side, the upper electrode 321 of the MIM capacitive element 320 on the lower semiconductor substrate 220 side, and the upper electrode of the MOM capacitive element 330 on the lower semiconductor substrate 220 side via metal bonding portions 231 and 232 made of copper (Cu). Furthermore, the lower electrode 412 of the MOS capacitive element 410 and the lower electrode of the MOM capacitive element 420 are connected to the lower electrode 312 of the MOS capacitive element 310 on the lower semiconductor substrate 220 side, the lower electrode 322 of the MIM capacitive element 320 on the lower semiconductor substrate 220 side, and the lower electrode of the MOM capacitive element 330 on the lower semiconductor substrate 220 side via the metal bonding portions 231 and 232 made of copper (Cu).

In FIGS. 6A and 6B, in the solid-state imaging device 100, the metal bonding portion 231 on the upper semiconductor substrate 210 side and the metal bonding portion 232 on the lower semiconductor substrate 220 side, which are disposed on the bonding surface, are bonded to form a capacitive element, and the capacitive element is connected in parallel with another capacitive element, and thus the capacitance density is further increased. This capacitive element is referred to as a bonding portion capacitive element 230.

An upper electrode 234 of the bonding portion capacitive element 230 is connected to the upper electrode 413 of the MOS capacitive element 410 and the upper electrode of the MOM capacitive element 420 via the via 414. Furthermore, a lower electrode 235 of the bonding portion capacitive element 230 is connected to the lower electrode 412 of the MOS capacitive element 410 and the lower electrode of the MOM capacitive element 420 via the via 415.

Moreover, the upper electrode 234 of the bonding portion capacitive element 230 is connected to the upper electrode 313 of the MOS capacitive element 310 on the lower semiconductor substrate 220 side, the upper electrode 321 of the MIM capacitive element 320 on the lower semiconductor substrate 220 side, and the upper electrode of the MOM capacitive element 330 on the lower semiconductor substrate 220 side. Furthermore, the lower electrode 235 of the bonding portion capacitive element 230 is connected to the lower electrode 312 of the MOS capacitive element 310 on the lower semiconductor substrate 220 side, the lower electrode 322 of the MIM capacitive element 320 on the lower semiconductor substrate 220 side, and the lower electrode of the MOM capacitive element 330 on the lower semiconductor substrate 220 side.

Operation Effect of First Embodiment

As described above, according to the first embodiment, the bonding portion capacitive element 230 is formed by the metal bonding portions 231 and 232 between the upper semiconductor substrate 210 and the lower semiconductor substrate 220, and the bonding portion capacitive element 230 is connected in parallel with the MOS capacitive element 410 and MOM capacitive element 420 included in the upper semiconductor substrate 210 and the MOS capacitive element 310, MIM capacitive element 320, and MOM capacitive element 330 included in the lower semiconductor substrate 220, and thus the capacitance values of all the entire capacitive elements can be increased. Therefore, the capacitance density of the capacitive element can be improved without decreasing the operating voltage.

Modification Example of First Embodiment

Figure 10:
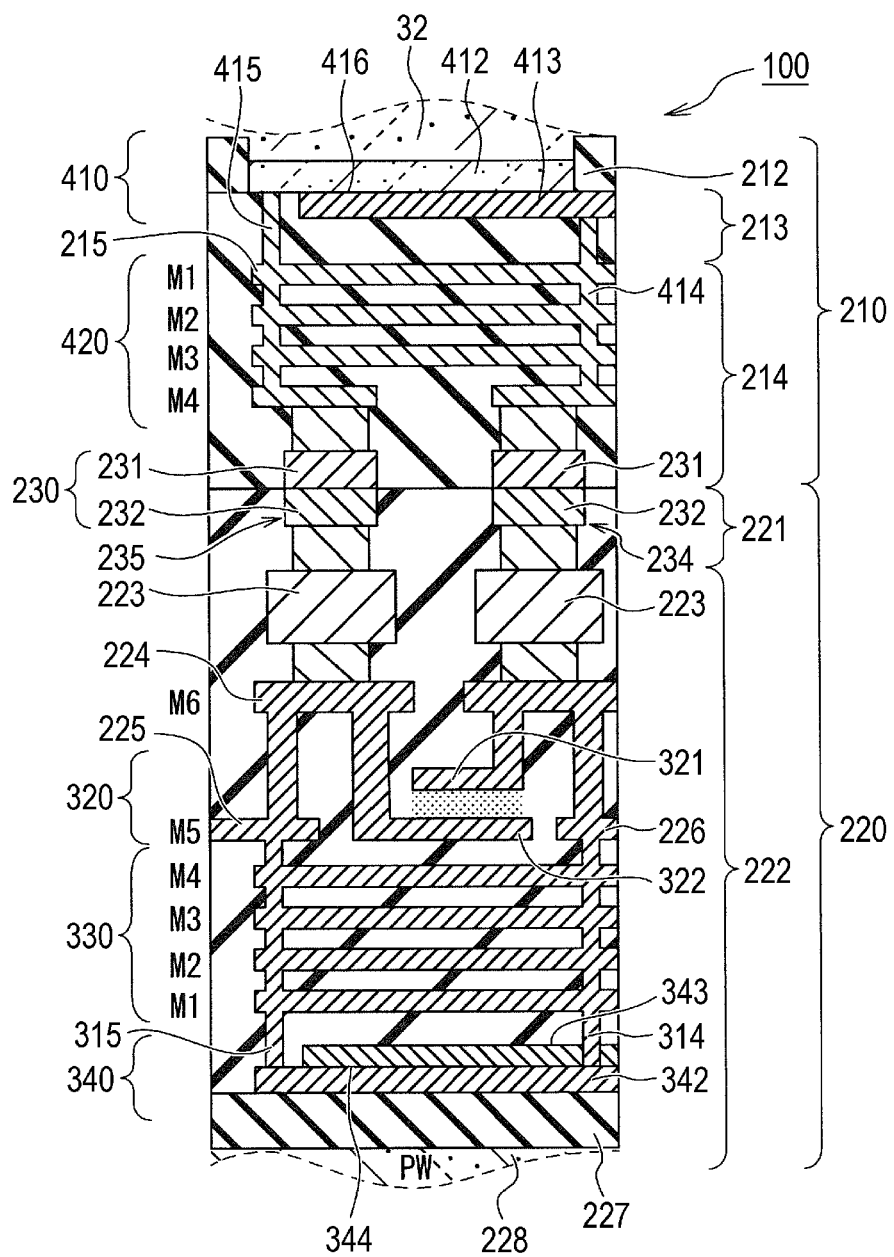
FIG. 10 is a cross-sectional view of a solid-state imaging device according to a modification example of the first embodiment.

FIG. 10 is a cross-sectional view of the solid-state imaging device 100 according to the modification example of the first embodiment. In FIG. 10, the same parts as those in FIG. 6A are denoted by the same reference numerals, and a detailed description thereof is omitted.

Figure 11:
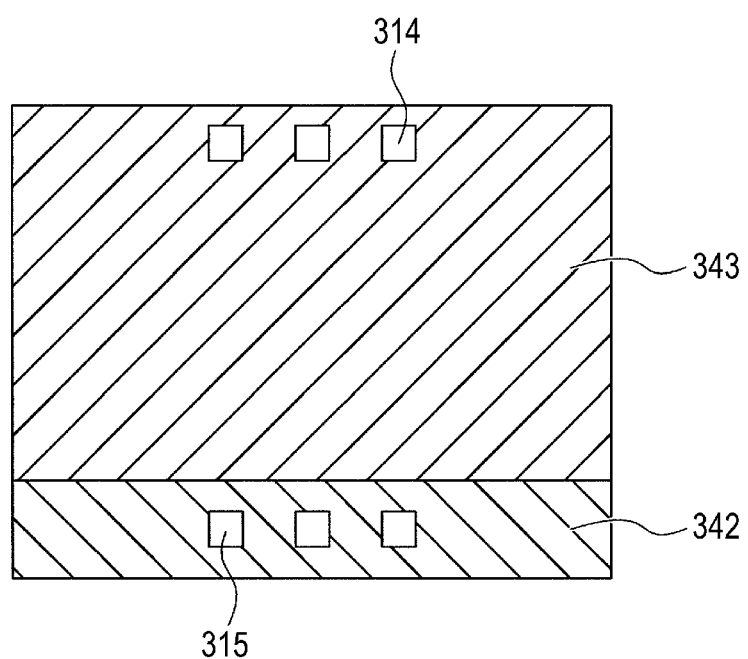
FIG. 11 is a plan view illustrating a configuration of a PIP capacitive element according to the modification example of the first embodiment.

In FIG. 10, the solid-state imaging device 100 is an example in which a poly insulator poly (PIP) capacitive element 340 is utilized. As illustrated in FIG. 11, the PIP capacitive element 340 is a capacitive element using polycrystalline silicon as an electrode, and is, for example, a capacitive element formed by sequentially stacking N-type polycrystalline Si to be a lower electrode 342, SiO2 as an insulating film, and N-type polycrystalline Si as an upper electrode. Characteristically, the bias dependence of the capacitance value is small.

An upper electrode 343 of the PIP capacitive element 340 is connected to the upper electrode 321 of the MIM capacitive element 320 via the via 314 and the wiring (M6) 224. Furthermore, the lower electrode 342 of the PIP capacitive element 340 is connected to the lower electrode 322 of the MIM capacitive element 320 via the via 315 and the wiring (M6) 224.

Therefore, even in the modification example of the first embodiment, the same operation effects as those of the first embodiment can be obtained.

Second Embodiment

Figure 12:
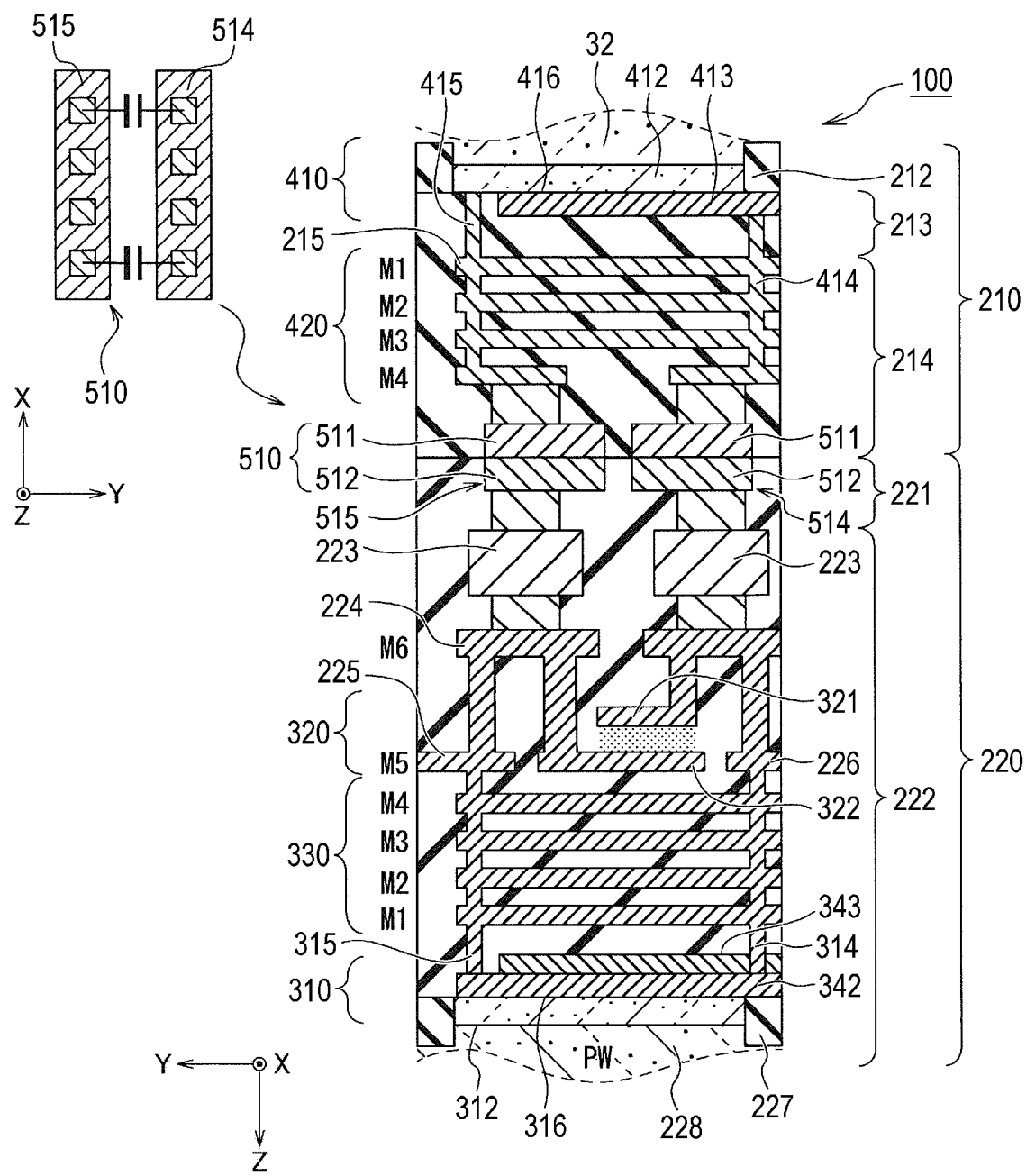
FIG. 12 is a cross-sectional view of a solid-state imaging device according to a second embodiment.

FIG. 12 is a cross-sectional view of a solid-state imaging device 100 according to the second embodiment. In FIG. 12, the same parts as those in FIG. 6A are denoted by the same reference numerals, and a detailed description thereof is omitted.

In FIG. 12, in the solid-state imaging device 100, a metal bonding portion 511 on the upper semiconductor substrate 210 side and a metal bonding portion 512 on the lower semiconductor substrate 220 side, which are disposed on the bonding surface, are bonded to form a bonding portion capacitive element 510.

In the second embodiment, an upper electrode 514 of the bonding portion capacitive element 510 and a lower electrode 515 of the bonding portion capacitive element 510 are brought close to each other to a distance at which the processing accuracy in the process is allowable to make the capacitance component large in a lateral direction, and thus the capacitance value of the capacitive element of the solid-state imaging device 100 can be further increased.

Operation Effect of Second Embodiment

As described above, according to the second embodiment, in the bonding portion capacitive element 510, the capacitance component in a direction orthogonal to the stacking direction (Z direction in FIG. 12) of the upper semiconductor substrate 210 and the lower semiconductor substrate 220 (Y direction in FIG. 12), that is, the lateral direction is used, and thus the capacitance value can be further increased.

First Modification Example of Second Embodiment

Figure 13:
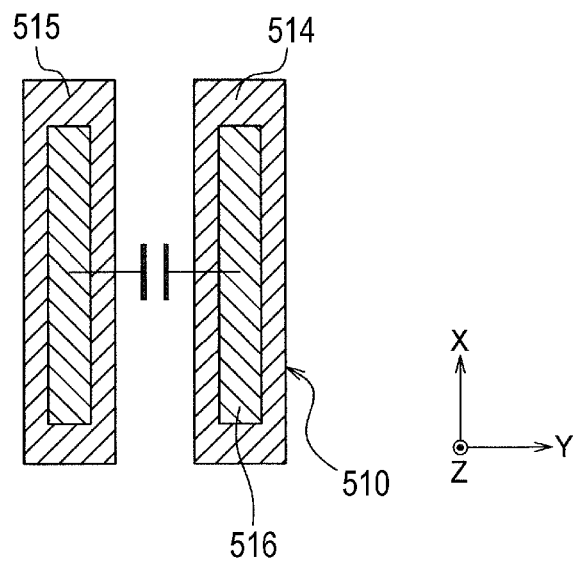
FIG. 13 is a plan view illustrating an arrangement example of a bonding portion capacitive element according to a first modification example of the second embodiment.

FIG. 13 is a plan view illustrating an arrangement example of the bonding portion capacitive element 510 according to the first modification example of the second embodiment of the present technology. As illustrated in FIG. 13, the vias 516 connected to the metal bonding portion are opposed to each other in a stretchable manner, the capacitance component of the vias 516 in the lateral direction is also used, and thus the capacitance value can be further increased.

Figure 14:
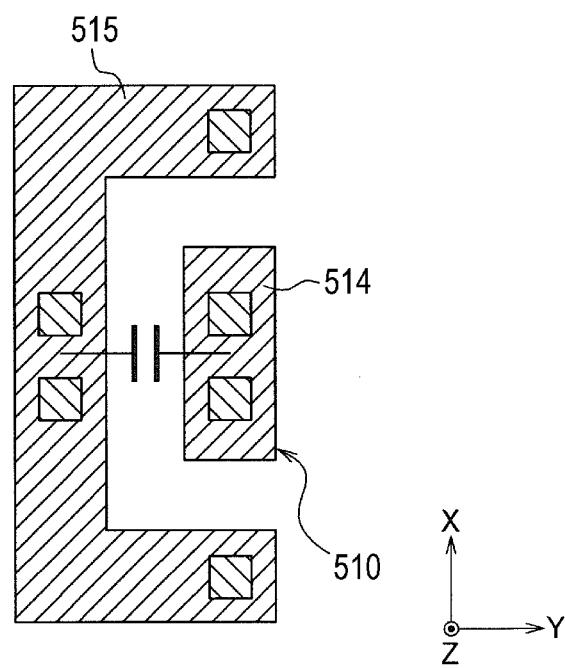
FIG. 14 is a plan view illustrating another arrangement example of a bonding portion capacitive element according to the first modification example of the second embodiment.
Figure 15:
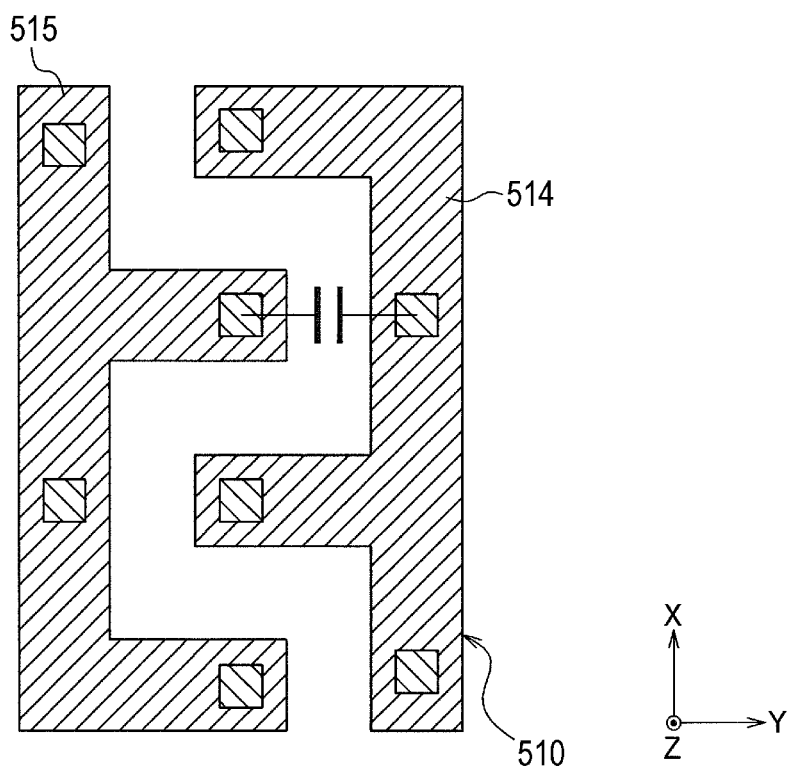
FIG. 15 is a plan view illustrating still another arrangement example of a bonding portion capacitive element according to the first modification example of the second embodiment.

Note that even in the arrangement example of the bonding portion capacitive elements 510 illustrated in FIGS. 14 and 15, the capacitance value can be further increased.

Second Modification Example of Second Embodiment

FIG. 16 is a cross-sectional view of the solid-state imaging device 100 according to the second modification example of the second embodiment of the present technology. In FIG. 16, the same parts as those in FIG. 12 are denoted by the same reference numerals, and a detailed description thereof is omitted.

In FIG. 16, in the solid-state imaging device 100, first metal films 521 and 523 on the upper semiconductor substrate 210 side and second metal films 522 and 524 on the lower semiconductor substrate 220 side, which are disposed on the bonding surface, are bonded to form a bonding portion capacitive element 520.

Figure 17:
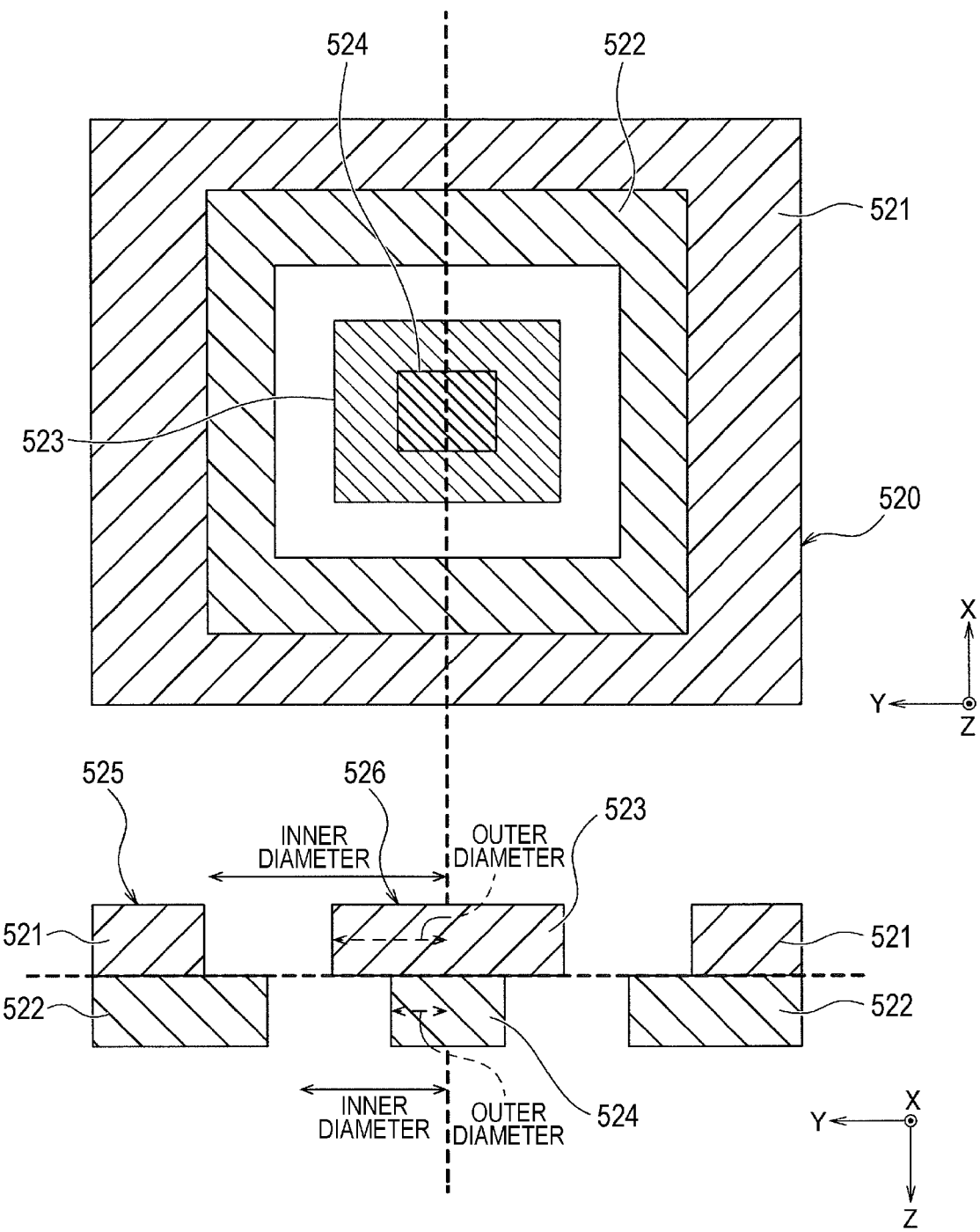
FIG. 17 is a view illustrating an arrangement example of a bonding portion capacitive element according to the second modification example of the second embodiment.

A problem of the bonding portion capacitive element 520 is that when a bonding-misalignment occurring when the upper semiconductor substrate 210 (sensor unit) and the lower semiconductor substrate 220 (peripheral circuit unit) are bonded is great, the capacitance value variation increases, but by adopting a layout illustrated in FIG. 17, the capacitance value variation with respect to the bonding-misalignment can be reduced. The specific layout includes a ring-shaped first electrode 525 and a second electrode 526 located at the center of the first electrode 525. The inner diameter of the first metal film 521 constituting the first electrode 525 is larger than the inner diameter of the second metal film 522 constituting the first electrode 525. The outer diameter of the first metal film 523 constituting the second electrode 526 is larger than the outer diameter of the second metal film 524 constituting the second electrode 526. In FIG. 17, the first electrode 525 of the bonding portion capacitive element 520 and the second electrode 526 of the bonding portion capacitive element 520 have a square layout, but may have a circular shape.

Figure 18:
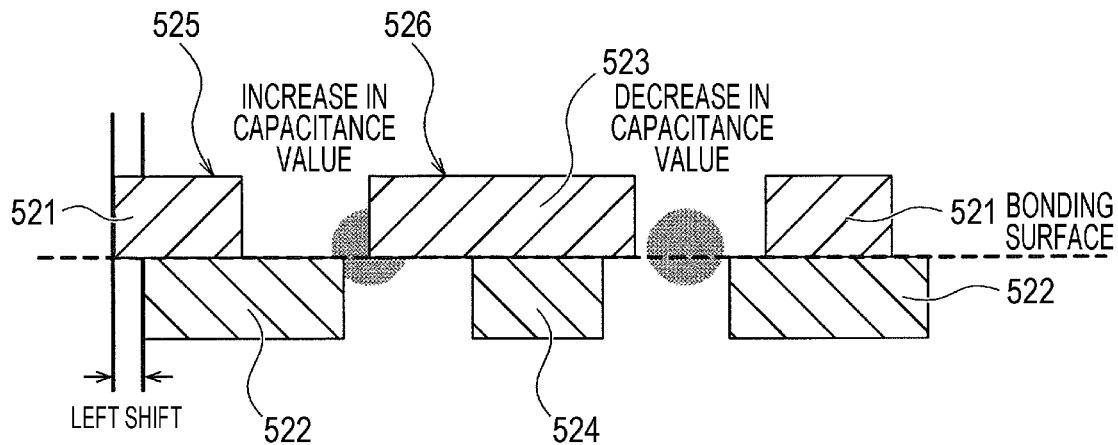
FIG. 18 is a view illustrating a change in a capacitance value in accordance with shift of a bonding portion capacitive element according to the second modification example of the second embodiment.

By adopting such a layout, as illustrated in FIG. 18, for example, in a case where the upper semiconductor substrate 210 (sensor unit) is shifted to the left side with respect to the lower semiconductor substrate 220 (peripheral circuit unit), the capacitance value of the left side surface of the bonding portion capacitive element 520 increases, but the capacitance value of the right side surface decreases. Therefore, it is possible to reduce the capacitance value variation of the entire bonding portion.

Furthermore, in a case where the upper semiconductor substrate 210 (sensor unit) is shifted to the right side with respect to the lower semiconductor substrate 220 (peripheral circuit unit), the reverse increase and decrease of the capacitance value occurs. However, also in this case, the variation of the capacitance value of the entire bonding portion is small, and as a result, even when the misalignment of the bonding portions is large, an element structure is provided in which the variation of the bonding portion capacitance value does not increase.

Figure 19:
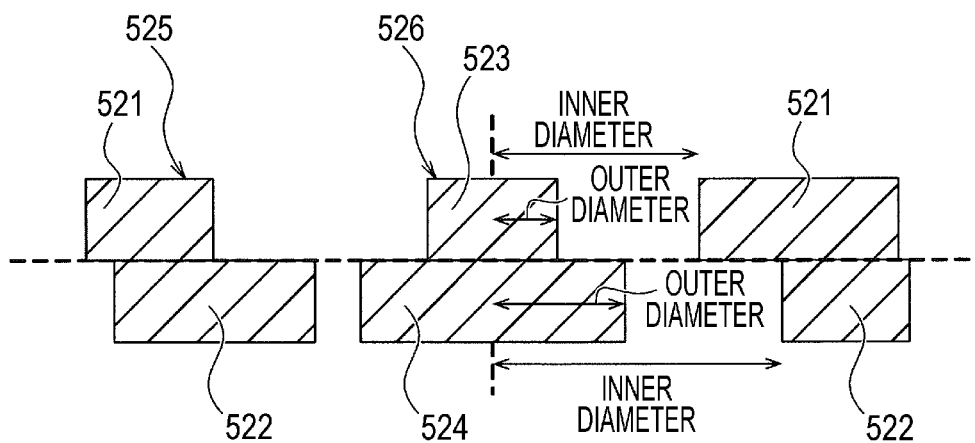
FIG. 19 is a view illustrating another arrangement example of a bonding portion capacitive element according to the second modification example of the second embodiment.

Furthermore, even in the layout illustrated in FIG. 19, it is possible to reduce the capacitance value variation with respect to the bonding misalignment. In this case, the inner diameter of the first metal film 521 constituting the first electrode 525 is smaller than the inner diameter of the second metal film 522 constituting the first electrode 525. The outer diameter of the first metal film 523 constituting the second electrode 526 is smaller than the outer diameter of the second metal film 524 constituting the second electrode 526.

FIG. 20 illustrates an example of types of capacitive elements arranged in each chip and a multiplication factor of the capacitance value in a case where the capacitive elements are connected in parallel. On the basis of the capacitance value in the case of the MOM capacitive element 330 alone disposed on the lower semiconductor substrate 220 (peripheral circuit unit), when all the described capacitive elements are connected in parallel, the capacitance value increases by ten times. Note that when the accumulation type MOS capacitive element 310 and the MIM capacitive element 320, which are disposed on the lower semiconductor substrate 220 (peripheral circuit unit), are connected in parallel, the capacitance value increases by 5.1 times. Furthermore, when the accumulation type MOS capacitive element 310, the MIM capacitive element 320, and the MOM capacitive element 330, which are disposed on the lower semiconductor substrate 220 (peripheral circuit unit), are connected in parallel, the capacitance value increases by 6.1 times.

Operation Effect According to Second Modification Example of Second Embodiment

According to the second modification example of the second embodiment, since the upper semiconductor substrate 210 is shifted to the left side or the right side with respect to the lower semiconductor substrate 220, the capacitance value variation of the bonding portion capacitive element 520 does not increase even when the misalignment of the bonding portions is large.

Third Modification Example of Second Embodiment

Figure 21:
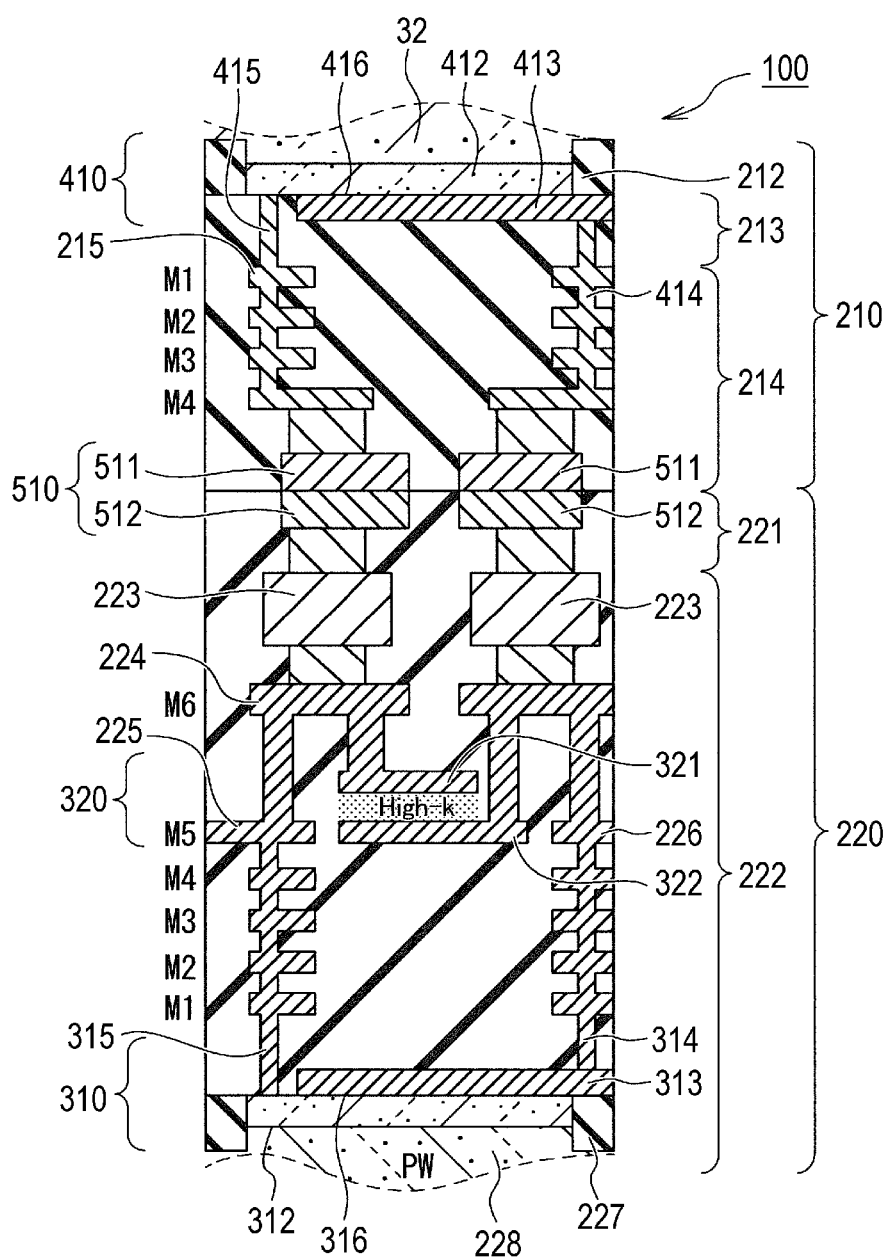
FIG. 21 is a cross-sectional view of a solid-state imaging device according to a third modification example of the second embodiment.

FIG. 21 is a cross-sectional view of the solid-state imaging device 100 according to the third modification example of the second embodiment of the present technology. In FIG. 21, the same parts as those in FIG. 12 are denoted by the same reference numerals, and a detailed description thereof is omitted.

The example of FIG. 21 is an example of a capacitive element in which the accumulation type MOS capacitive element 310 and the MIM capacitive element 320 are disposed on the same area of the lower semiconductor substrate 220 (peripheral circuit unit), the bonding portion capacitive element 510 is disposed at the bonding portion, the accumulation type MOS capacitive element 410 is disposed in the upper semiconductor substrate 210 (sensor unit), and all of the accumulation type MOS capacitive element 310, the MIM capacitive element 320, the bonding portion capacitive element 510, and the accumulation type MOS capacitive element 410 are connected in parallel.

Even in the third modification example, the same operation effects as those of the second embodiment can be obtained.

Fourth Modification Example of Second Embodiment

Figure 22:
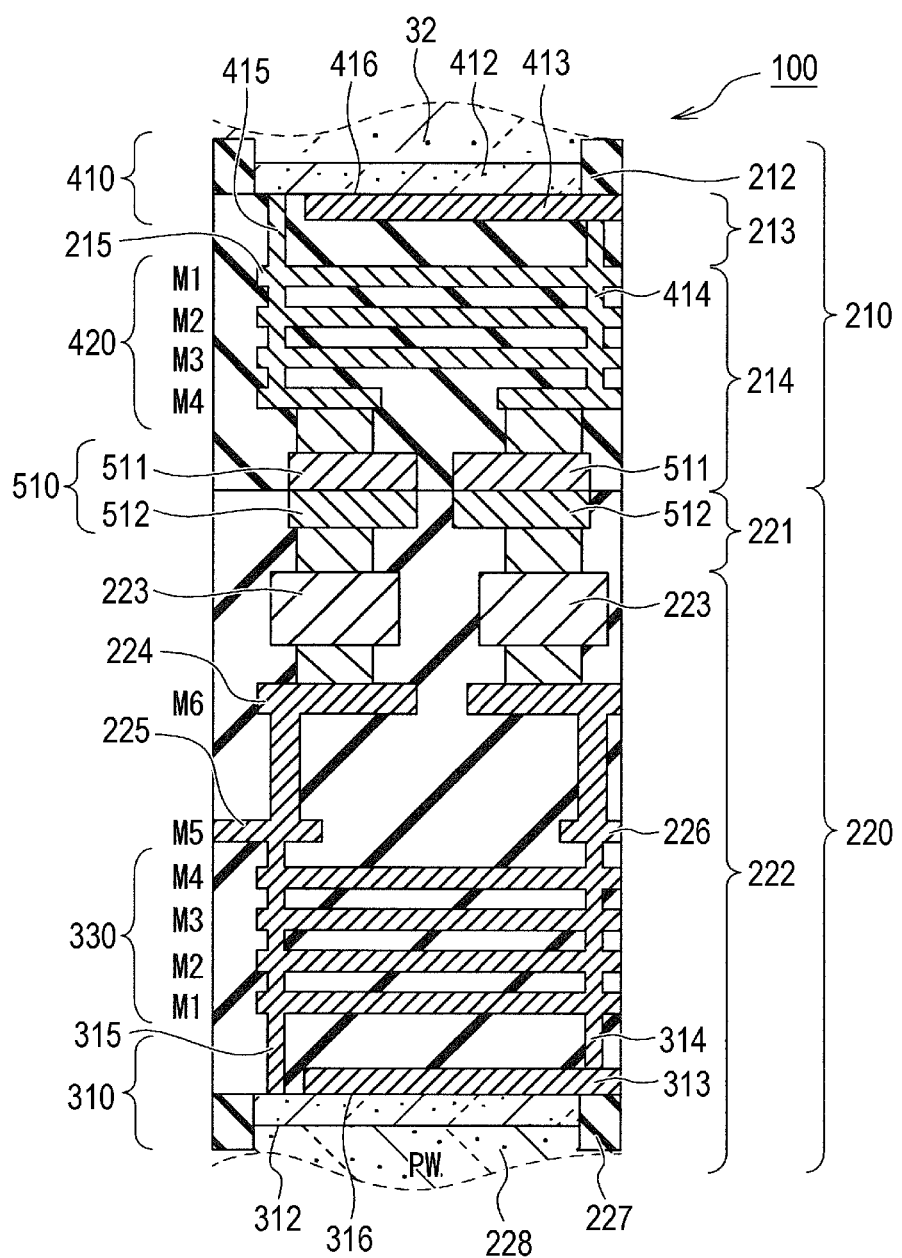
FIG. 22 is a cross-sectional view of a solid-state imaging device according to a fourth modification example of the second embodiment.

FIG. 22 is a cross-sectional view of the solid-state imaging device 100 according to the fourth modification example of the second embodiment of the present technology. In FIG. 22, the same parts as those in FIG. 12 are denoted by the same reference numerals, and a detailed description thereof is omitted.

The example of FIG. 22 is an example of a capacitive element in which the accumulation type MOS capacitive element 310 and the MOM capacitive element 330 are disposed on the same area of the lower semiconductor substrate 220 (peripheral circuit unit), the bonding portion capacitive element 510 is disposed at the bonding portion, the accumulation type MOS capacitive element 410 and the MOM capacitive element 420 are disposed in the upper semiconductor substrate 210 (sensor unit), and all of the accumulation type MOS capacitive element 310, the MOM capacitive element 330, the bonding portion capacitive element 510, the accumulation type MOS capacitive element 410, and the MOM capacitive element 420 are connected in parallel.

Even in the fourth modification example, the same operation effects as those of the second embodiment can be obtained.

Fifth Modification Example of Second Embodiment

Figure 23:
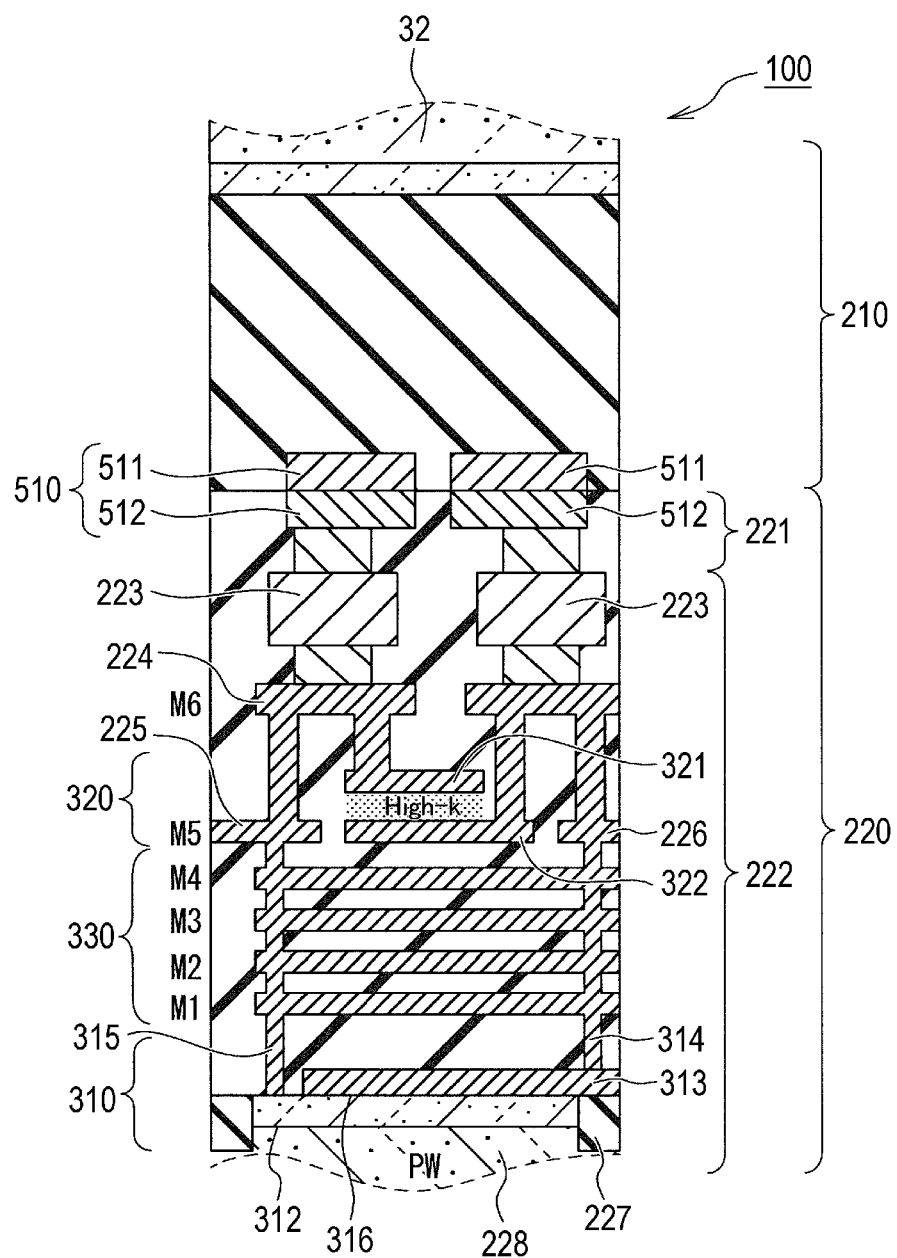
FIG. 23 is a cross-sectional view of a solid-state imaging device according to a fifth modification example of the second embodiment.

FIG. 23 is a cross-sectional view of the solid-state imaging device 100 according to the fifth modification example of the second embodiment of the present technology. In FIG. 23, the same parts as those in FIG. 12 are denoted by the same reference numerals, and a detailed description thereof is omitted.

The example of FIG. 23 is an example of a capacitive element in which the accumulation type MOS capacitive element 310 and the MOM capacitive element 330 are disposed on the same area of the lower semiconductor substrate 220 (peripheral circuit unit), the bonding portion capacitive element 510 is disposed at the bonding portion, any of the capacitive elements is not disposed in the upper semiconductor substrate 210 (sensor unit), and the accumulation type MOS capacitive element 310, the MOM capacitive element 330, and the bonding portion capacitive element 510 are connected in parallel.

Even in the fifth modification example, the same operation effects as those of the second embodiment can be obtained.

Another Modification Example of Second Embodiment

The second embodiment is not limited thereto. For example, in a case where the upper semiconductor substrate 210 (sensor unit) and the lower semiconductor substrate 220 (peripheral circuit unit) are manufactured by a general CMOS process, there are a plurality of capacitive elements that can be mounted on each of the upper semiconductor substrate 210 and the lower semiconductor substrate 220. A person skilled in the art can easily imagine that there are many combinations of the capacitive elements that can be connected in parallel in a case where the bonding portion capacitive element 510 illustrated in FIG. 12 is added. The designer is only required to select the capacitive elements to be connected in parallel so as to be optimal according to the layout of the entire circuit and the required capacitance value.

Third Embodiment

Figure 24:
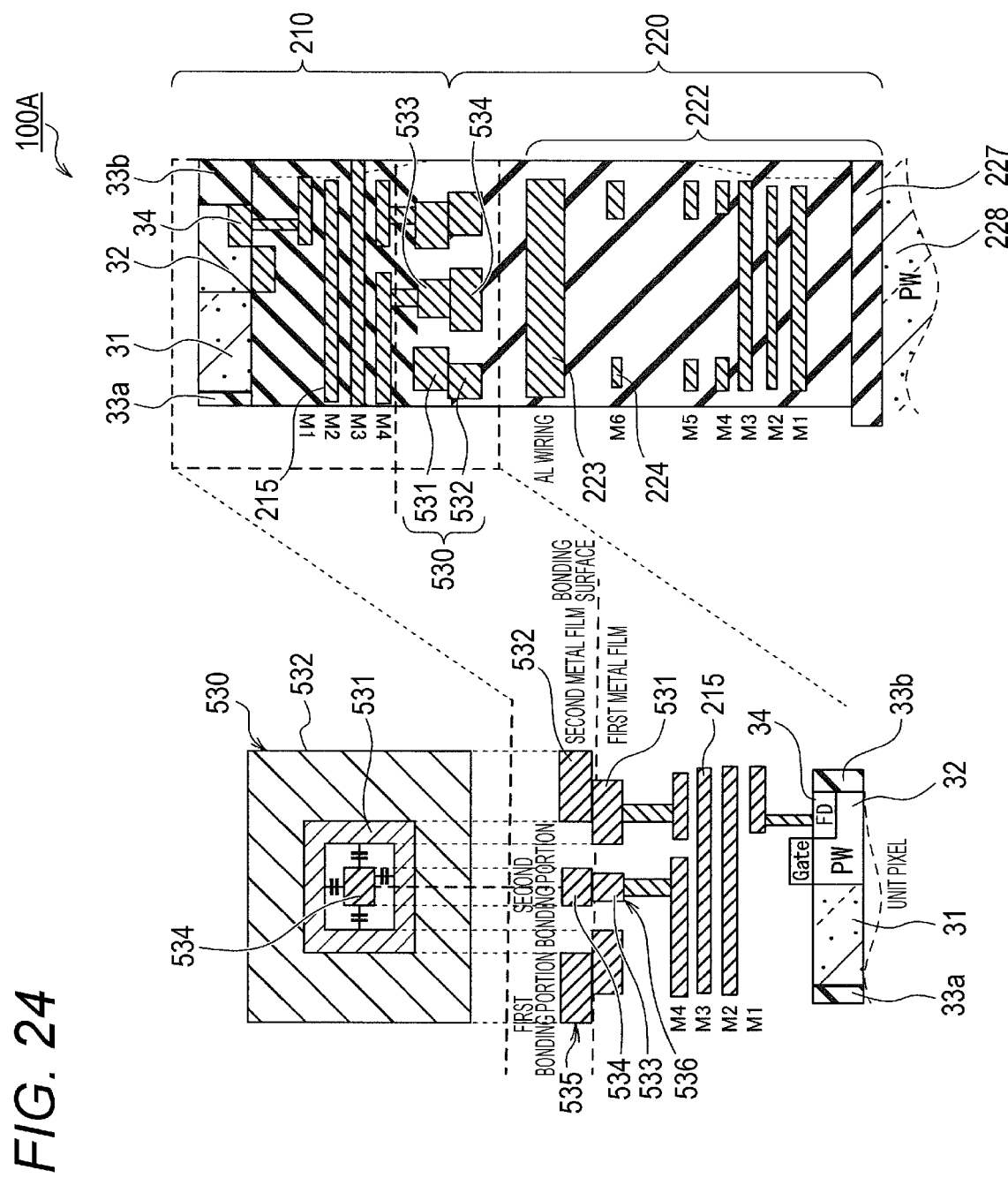
FIG. 24 is a cross-sectional view of a solid-state imaging device according to a third embodiment.

FIG. 24 is a cross-sectional view of a solid-state imaging device 100A according to the third embodiment. In FIG. 24, the same parts as those in FIG. 6B are denoted by the same reference numerals, and a detailed description thereof is omitted.

In FIG. 24, in the solid-state imaging device 100A, first metal films 531 and 533 on the upper semiconductor substrate 210 side and second metal films 532 and 534 on the lower semiconductor substrate 220 side, which are disposed on the bonding surface, are bonded to form a bonding portion capacitive element 530.

The bonding portion capacitive element 530 includes a ring-shaped first electrode 535 and a second electrode 536 located at the center of the first electrode 535. The inner diameter of the first metal film 531 constituting the first electrode 535 is smaller than the inner diameter of the second metal film 532 constituting the first electrode 535. The outer diameter of the first metal film 533 constituting the second electrode 536 is smaller than the outer diameter of the second metal film 534 constituting the second electrode 536. In FIG. 24, the first electrode 535 of the bonding portion capacitive element 530 and the second electrode 536 of the bonding portion capacitive element 530 have a square layout, but may have a circular shape.

The solid-state imaging device 100A expands the dynamic range of an imaging element by providing a capacitive element that accumulates electric charges overflowing from a photodiode 31 in the pixel. The present invention is preferably applied to a stacked image sensor having an in-pixel capacitive element. Two first metal films 531 and 533 and two second metal films 532 and 534, which are disposed for each pixel, are bonded to form a bonding portion capacitive element 530. In the bonding portion capacitive element 530, even when misalignment of the bonding surfaces occurs, the capacitance value variation between the electrodes decreases, and the variation in the dynamic range of the pixel can be reduced. In addition, in the related art, in order to form an in-pixel capacitor in the sensor unit, a manufacturing process therefor is required. However, in the third embodiment, since the in-pixel capacitor is formed using the first metal films 531 and 533 and the second metal films 532 and 534, which connect the upper semiconductor substrate 210 (sensor unit) with the lower semiconductor substrate 220 (peripheral circuit unit), the dynamic range can be expanded at low cost without increasing the manufacturing process.

Fourth Embodiment

The fourth embodiment of the present disclosure will describe a solid-state imaging device in which a photoelectric conversion element and an amplification transistor that amplifies a signal from the photoelectric conversion element are disposed on different substrates, and three substrates on which a sensor unit in which the photoelectric conversion element and a transfer gate (TRG) are disposed, a pixel transistor unit in which a pixel transistor such as an amplification transistor is disposed, and a peripheral circuit unit in which a signal processing circuit that processes a signal from the amplification transistor is disposed are mounted are stacked by the WoW technology.

Figures 25A, 25B:
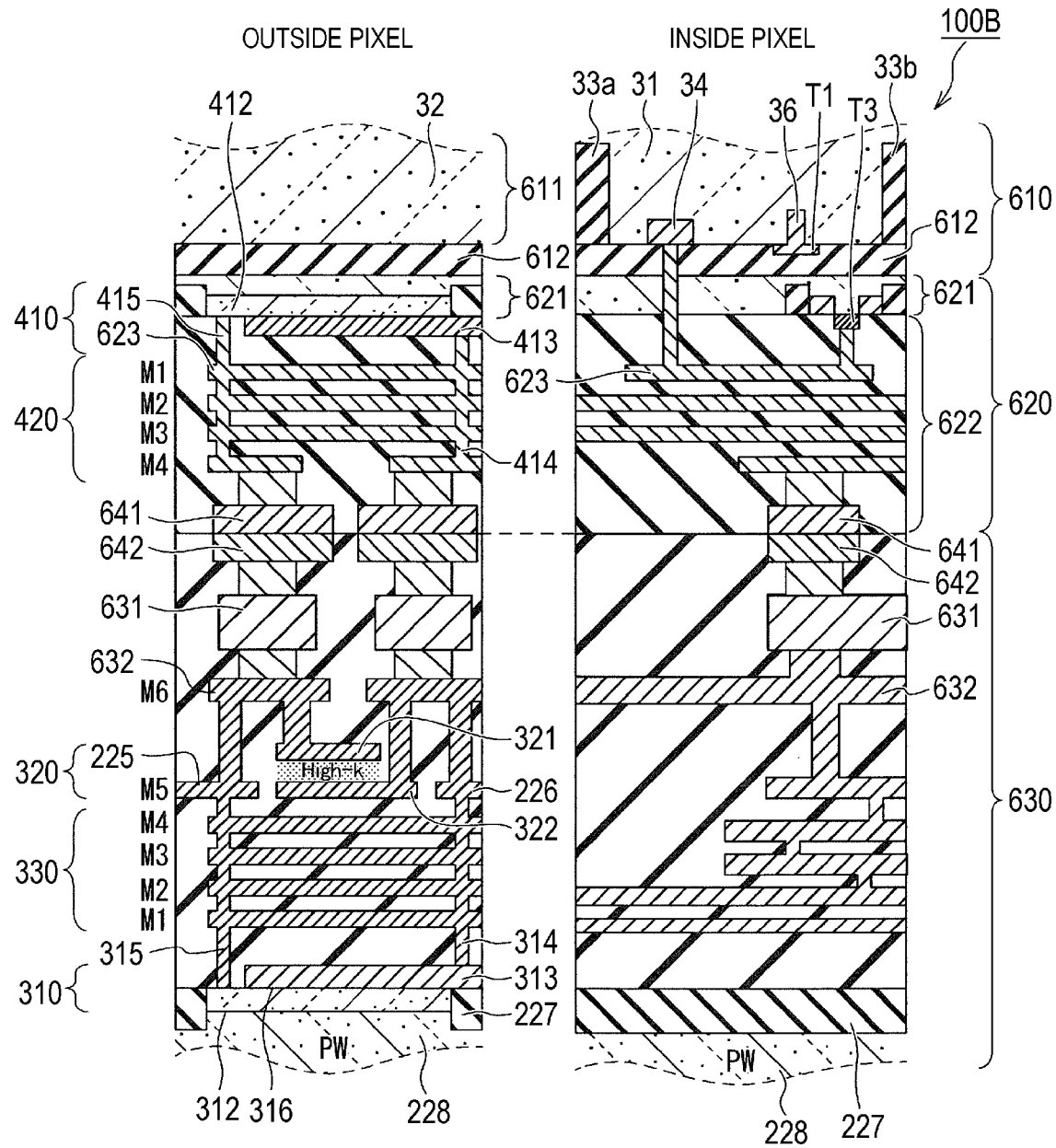
FIGS. 25A and 25B are cross-sectional views of a solid-state imaging device according to a fourth embodiment.

FIGS. 25A and 25B are cross-sectional views of a solid-state imaging device 100B according to the fourth embodiment. FIG. 25A illustrates the outside of the pixel, and FIG. 25B illustrates the inside of the pixel. In FIGS. 25A and 25B, the same parts as those in FIGS. 6A and 6B are denoted by the same reference numerals, and a detailed description thereof is omitted.

Figure 26:
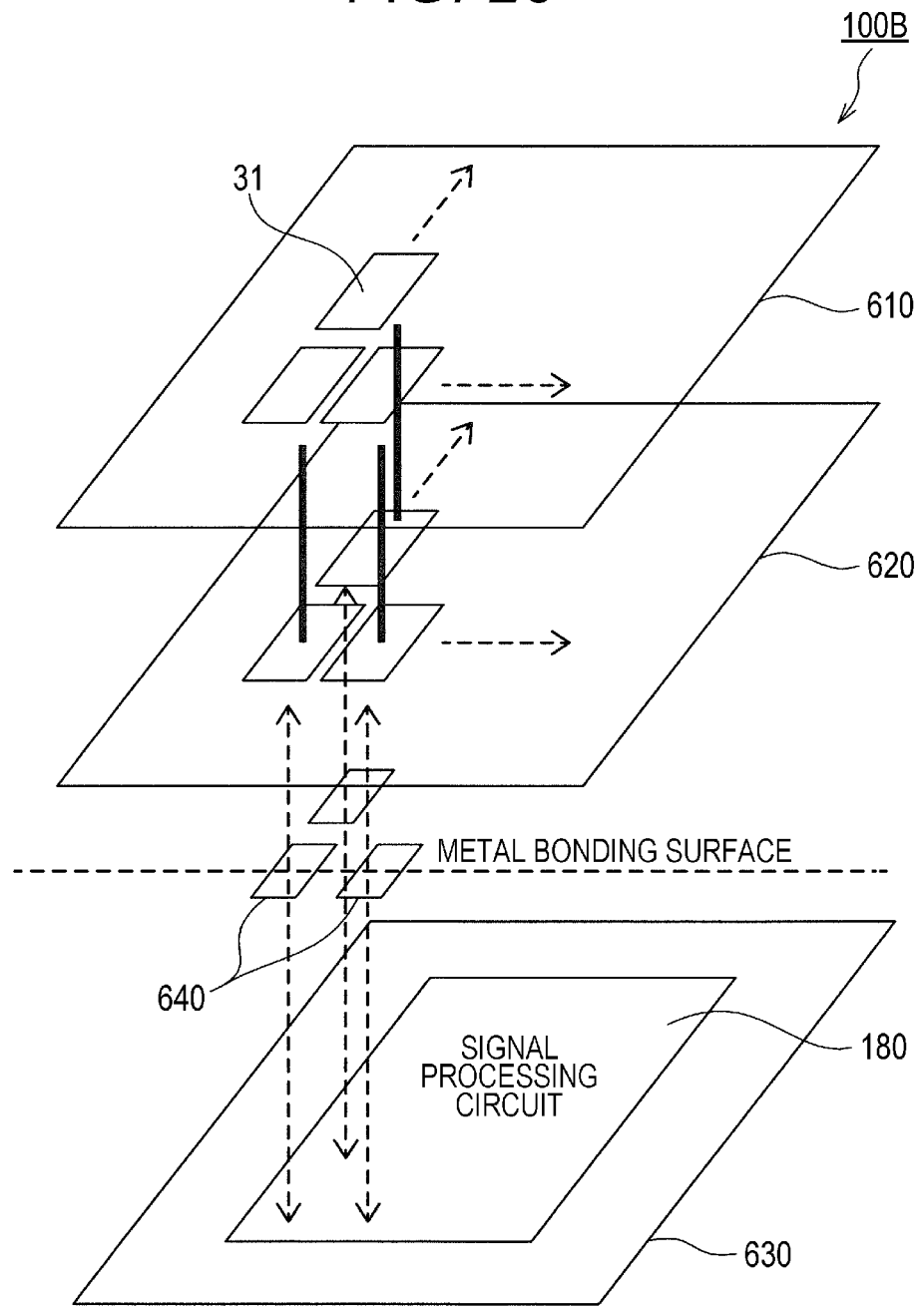
FIG. 26 is a schematic view illustrating a sensor unit, a pixel transistor unit, and a peripheral circuit unit according to the fourth embodiment.
Figure 27:
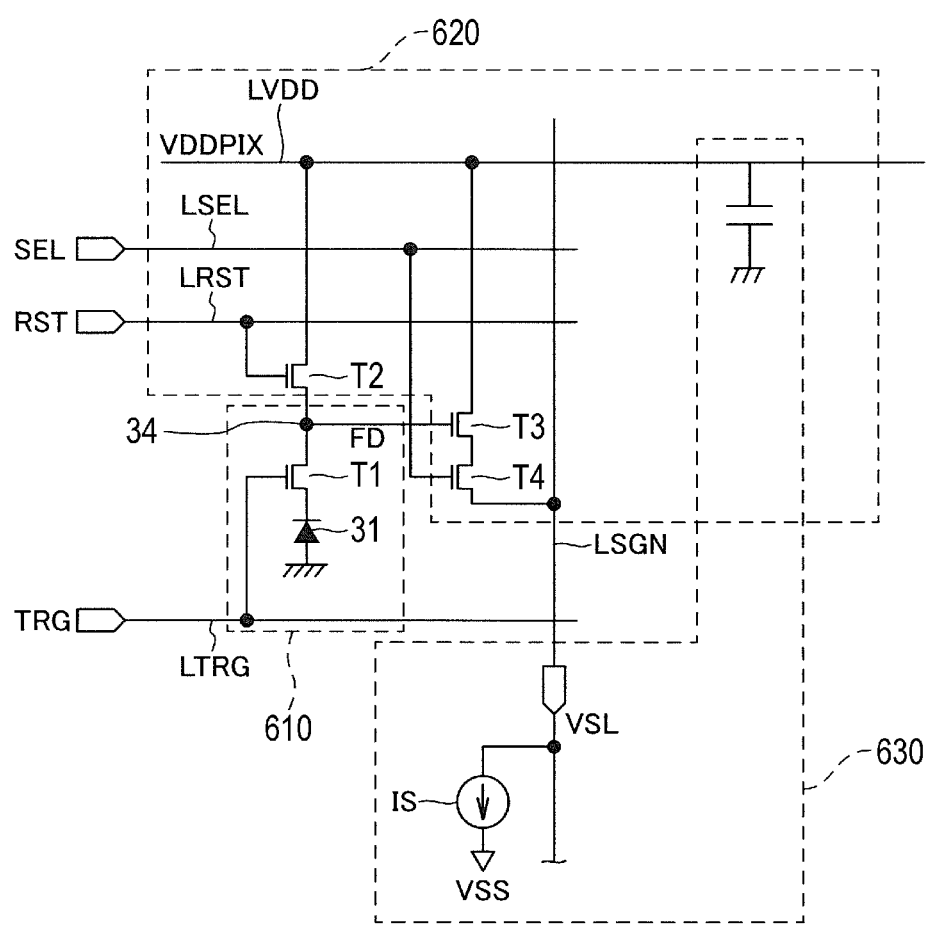
FIG. 27 is an equivalent circuit diagram illustrating a sensor unit, a pixel transistor unit, and a peripheral circuit unit according to the fourth embodiment.

The solid-state imaging device 100B includes a sensor unit 610, a pixel transistor unit 620, and a peripheral circuit unit 630 from the top. As illustrated in FIG. 26, the solid-state imaging device 100B includes a stacked image sensor in which three semiconductor chips of the sensor unit 610, the pixel transistor unit 620, and the peripheral circuit unit 630 are stacked, and a part of wiring is electrically connected by a metal bonding portion 640. As illustrated in FIG. 27, a transfer transistor T1, a photodiode 31, and a floating diffusion FD 34 are disposed in the sensor unit 610. A reset transistor T2, an amplification transistor T3, a selection transistor T4 are disposed in the pixel transistor unit 620.

Referring back to FIGS. 25A and 25B, the sensor unit 610 includes a photoelectric conversion layer 611 and an inter-layer insulating film 612 from the top. The photoelectric conversion layer 211 is a layer in which a photodiode (PD) 31 is formed, the photoelectric conversion layer generating an electric charge corresponding to the amount of incident light by photoelectric conversion. The PD 31 is electrically separated by element separation portions 33a and 33b formed in the photoelectric conversion layer 611 for each pixel 30. Furthermore, the FD 34 and a gate electrode 36 of the transfer transistor T1 are formed in the photoelectric conversion layer 611. Note that as illustrated in FIG. 25A, only a p-type well 32 is provided outside the pixel 30. The transfer transistor T1 is formed in the inter-layer insulating film 612.

The pixel transistor unit 620 includes a p-type well 621 and a wiring layer 622 from the top. An n-type diffusion layer is formed in the p-type well 621. The wiring layer 622 includes wiring (M1 to M4) 623 formed by being stacked in a plurality of layers. The transfer transistor T1, the reset transistor T2, the amplification transistor T3, and the selection transistor T4, which constitute each pixel 30, are driven via the plurality of layers (M1 to M4) of the wiring 623 formed in the wiring layer 622. Furthermore, a metal bonding portion 641 made of copper (Cu) is provided in the wiring layer 622 to perform bonding with the peripheral circuit unit 630.

On the other hand, the peripheral circuit unit 630 includes an inter-layer insulating film and a wiring layer from the top. The wiring layer includes entire wiring 631 and wiring (M1 to M6) 632 formed by being stacked in a plurality of layers. Furthermore, the inter-layer insulating film is provided with a metal bonding portion 642 made of copper (Cu) for bonding to the metal bonding portion 641 of the pixel transistor unit 620.

In the solid-state imaging device 100B having the above-described configuration, light incident on the sensor unit 610 is photoelectrically converted by the PD 31, and thus electric charge is generated. Then, the generated electric charge is output, as a pixel signal, to the ADC group 150 formed on the peripheral circuit unit 630 through the signal line LSGN illustrated in FIG. 1 formed by the wiring (M1 to M4) 623 and the wiring (M1 to M6) 632 of the peripheral circuit unit 630 via the amplification transistor T3.

As illustrated in FIG. 25A, an N+ accumulation type MOS capacitive element 310 is disposed on the peripheral circuit unit 630. An MOM capacitive element 330 and an MIM capacitive element 320 are disposed in the upper layer of the MOS capacitive element 310.

An N+ accumulation type MOS capacitive element 410 is disposed on the lower side of the pixel transistor unit 620. In a region in which the wiring (M1 to M4) 623, which is a layer on the opposite side to the pixel transistor unit 620 side in the same region in which the MOS capacitive element 410 is disposed, is formed, an MOM capacitive element 420 is formed using the wiring (M1 to M4) 623. In this case, as illustrated in FIG. 26, an upper electrode 421 of the MOM capacitive element 420 is connected to an upper electrode 413 of the MOS capacitive element 410 via a via 414. Furthermore, a lower electrode 422 of the MOM capacitive element 420 is connected to a lower electrode 412 of the MOS capacitive element 410 via a via 415.

Moreover, the upper electrode 413 of the MOS capacitive element 410 and the upper electrode 421 of the MOM capacitive element 420 are connected to the upper electrode 313 of the MOS capacitive element 310 on the peripheral circuit unit 630 side, the lower electrode 322 of the MIM capacitive element 320 on the peripheral circuit unit 630 side, and the upper electrode 331 of the MOM capacitive element 330 on the peripheral circuit unit 630 side via metal bonding portions 641 and 642 made of copper (Cu). Furthermore, the lower electrode 412 of the MOS capacitive element 410 and the lower electrode 422 of the MOM capacitive element 420 are connected to the lower electrode 312 of the MOS capacitive element 310 on the peripheral circuit unit 630 side, the upper electrode 321 of the MIM capacitive element 320 on the peripheral circuit unit 630 side, and the lower electrode 332 of the MOM capacitive element 330 on the peripheral circuit unit 630 side via the metal bonding portions 641 and 642 made of copper (Cu).

Operation Effect of Fourth Embodiment

As described above, according to the fourth embodiment, the same operation effects as those of the first embodiment can be obtained.

Fifth Embodiment

The fifth embodiment of the present disclosure will describe a solid-state imaging device applied to a light detection device using a single photon avalanche diode (SPAD).

Figure 28:
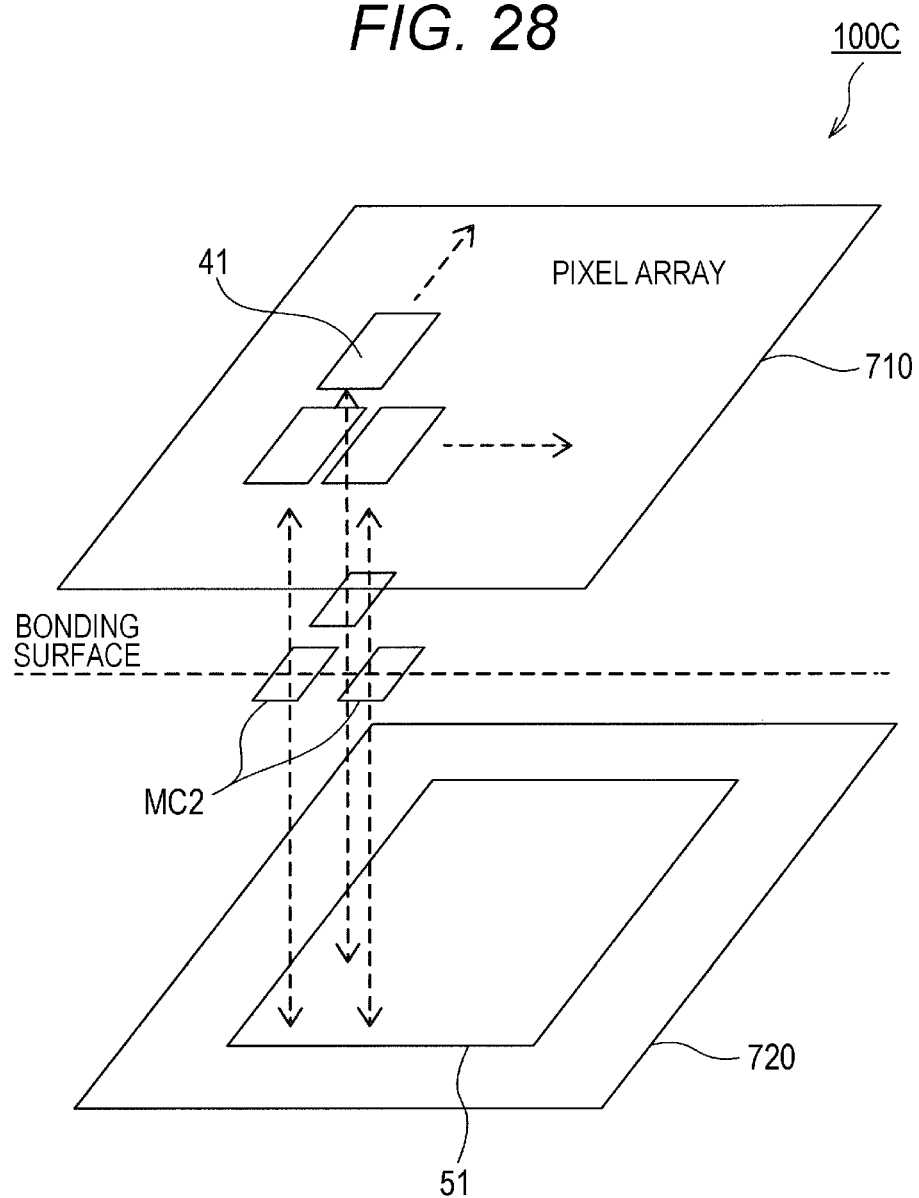
FIG. 28 is an arrangement view of each circuit on a semiconductor chip constituting a solid-state imaging device according to a fifth embodiment.

FIG. 28 is an arrangement view of each circuit on a semiconductor chip constituting a solid-state imaging device 100C according to the fifth embodiment. The solid-state imaging device 100C according to the fourth embodiment includes a stacked image sensor in which two semiconductor chips of an upper semiconductor substrate 710 and a lower semiconductor substrate 720 are stacked, and parts of wiring of the upper and lower chips are electrically connected by a metal bonding portion MC2 such as a through-silicon via (TSV). In this case, an SPAD photodiode 41 is arranged in a matrix in the upper semiconductor substrate 710, and a peripheral circuit 51 such as the ADC group 150 or the signal processing circuit 180, other than the SPAD photodiode 41, is mounted on the lower semiconductor substrate 720.

Figure 29:
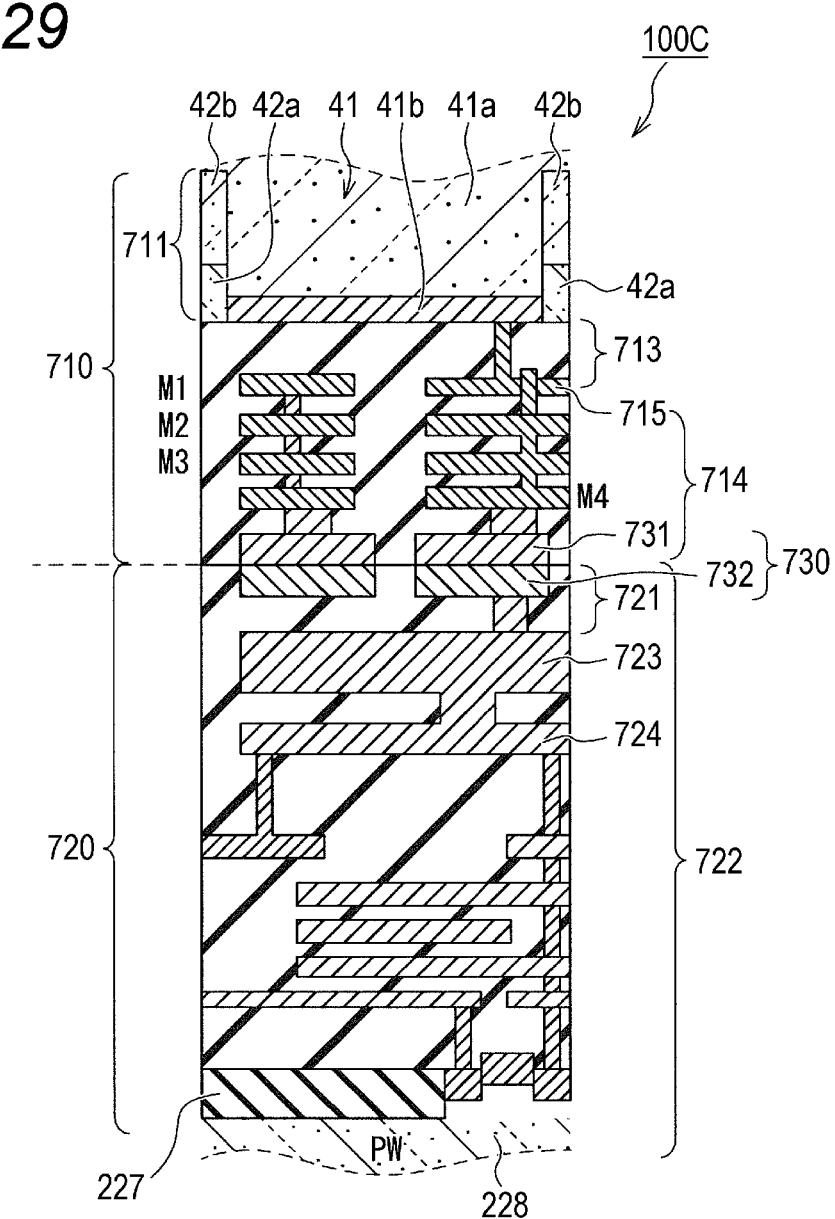
FIG. 29 is a cross-sectional view of a solid-state imaging device according to the fifth embodiment.

FIG. 29 is a cross-sectional view of the solid-state imaging device 100C according to the fifth embodiment.

In FIG. 29, the upper semiconductor substrate 710 includes a photoelectric conversion layer 711, an inter-layer insulating film 713, and a wiring layer 714 from the top. The photoelectric conversion layer 711 is a layer in which the SPAD photodiode 41 is formed, the photoelectric conversion layer 711 detecting incident light (photon), and converting a carrier generated by the detection into an electric signal pulse by using avalanche multiplication. The SPAD photodiode 41 is electrically separated by a p-type diffusion layer 42a and an n-type diffusion layer 42b which are formed in the photoelectric conversion layer 711 for each pixel 30.

The electric signal pulse generated from the SPAD photodiode 41 is output to wiring (M1 to M4) 715 formed in the wiring layer 714 via a via 716 formed in the inter-layer insulating film 713. A metal bonding portion 731 made of copper (Cu) is provided in the wiring layer 714 to perform bonding with the lower semiconductor substrate 720.

On the other hand, the lower semiconductor substrate 720 includes an inter-layer insulating film 721 and a wiring layer 722 from the top. The wiring layer 722 includes entire wiring 723 and wiring (M1 to M6) 724 formed by being stacked in a plurality of layers. Furthermore, the inter-layer insulating film 721 is provided with a metal bonding portion 732 made of copper (Cu) for bonding to the metal bonding portion 731 of the upper semiconductor substrate 710.

In the solid-state imaging device 100C having the above-described configuration, light detected in the upper semiconductor substrate 210 is photoelectrically converted by the SPAD photodiode 41, and thus the electric signal pulse is generated. Then, the electric signal pulse is output to the peripheral circuit 51 via the signal line LSGN illustrated in FIG. 1 formed by the wiring (M1 to M4) 715 and the wiring (M1 to M6) 724 of the lower semiconductor substrate 720.

Operation Effect of Fifth Embodiment

As described above, according to the fifth embodiment, the same operation effects as those of the first embodiment can be obtained, and the bonding portion capacitive element 730 is configured. According to this, the bonding portion capacitive element 730 can be caused to function as a memory element that temporarily accumulates an electric signal from the upper semiconductor substrate 710 (sensor unit), and the performance of the SPAD can be improved.

Sixth Embodiment

In the first to fifth embodiments, a case where the semiconductor device according to the present technology is applied to a solid-state imaging device which is an example of an electronic apparatus has been described as an example. In the sixth embodiment, a case where the semiconductor device according to the present technology is applied to other electronic apparatuses will be described as an example.

Figure 30:
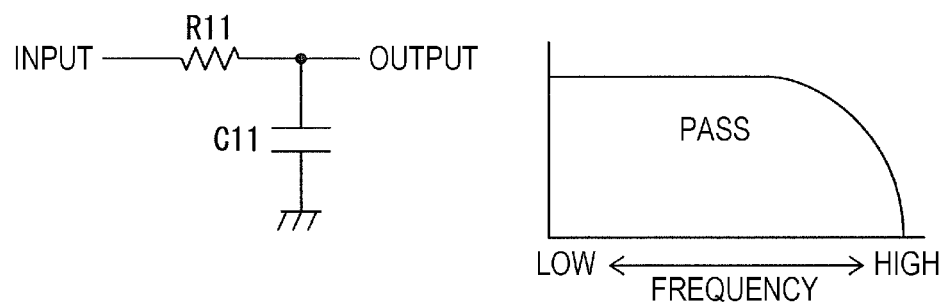
FIG. 30 is an equivalent circuit diagram of a filter circuit according to a sixth embodiment.

For example, the semiconductor device according to the present technology can be applied to a capacitor constituting a general filter circuit. As illustrated in FIG. 30, the general filter circuit includes a resistor R11 and a capacitor C11, and the semiconductor device according to the present technology can be applied as the configuration of the capacitor C11. By applying the semiconductor device according to the present technology to the capacitor C11 constituting the filter circuit, a large capacity can be realized, and a passband can be further extended.

Figure 31:
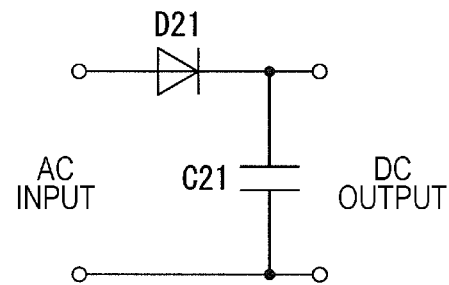
FIG. 31 is an equivalent circuit diagram of a smoothing circuit according to the sixth embodiment.
Figure 32:
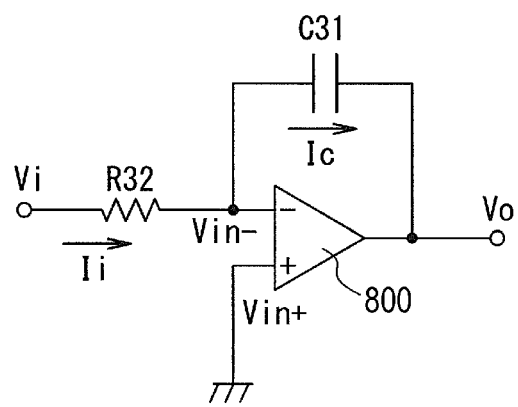
FIG. 32 is an equivalent circuit diagram of an integration circuit according to the sixth embodiment.

Furthermore, the semiconductor device according to the present technology can be applied to a capacitor constituting a general smoothing circuit. As illustrated in FIG. 31, the general filter circuit includes a diode D21 and a capacitor C21, and the semiconductor device according to the present technology can be applied as the configuration of the capacitor C21. By applying the semiconductor device according to the present technology to the capacitor C21 constituting the filter circuit, a large capacity can be realized, and an alternating current can be accurately converted into a direct current Furthermore, the semiconductor device according to the present technology can be applied to a capacitor constituting a general integration circuit. As illustrated in FIG. 32, the general integration circuit includes a resistor R32, a capacitor C31, and an operational amplifier 800, and the semiconductor device according to the present technology can be applied as the configuration of the capacitor C31.

Figure 33:
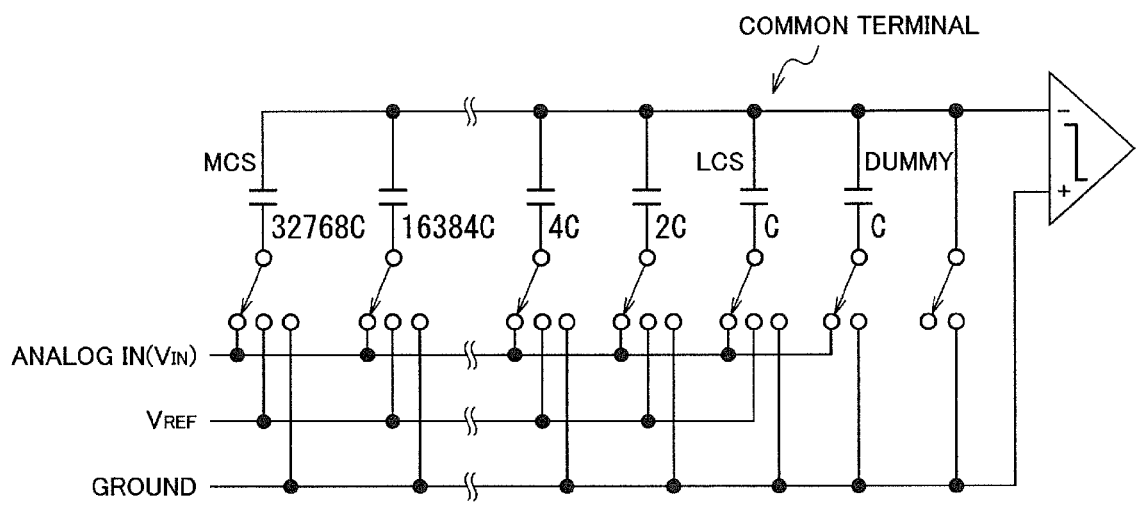
FIG. 33 is an equivalent circuit diagram of a capacitive DAC according to the sixth embodiment.

Moreover, the semiconductor device according to the present technology can be applied to a capacitive DAC illustrated in FIG. 33. The capacitive DAC includes a plurality of stages of capacitors, and the semiconductor device according to the present technology can be applied as a configuration having a plurality of stages of the capacitors.

Another Embodiment

As described above, the present technology has been described by the first to sixth embodiments and the modification examples of the first to second embodiments, but it should not be understood that the description and drawings constituting a part of this disclosure limit the present technology. It will be apparent to those skilled in the art that various alternative embodiments, examples, and operation techniques can be included in the present technology when the technical contents disclosed in the first to sixth embodiments are understood. Furthermore, the configurations disclosed in the first to sixth embodiments and the modification examples of the first and second embodiments can be appropriately combined within a range in which no contradiction occurs. For example, configurations disclosed in a plurality of different embodiments may be combined, or configurations disclosed in a plurality of different modification examples of the same embodiment may be combined.

Application Example to Electronic Apparatus

Figure 34:
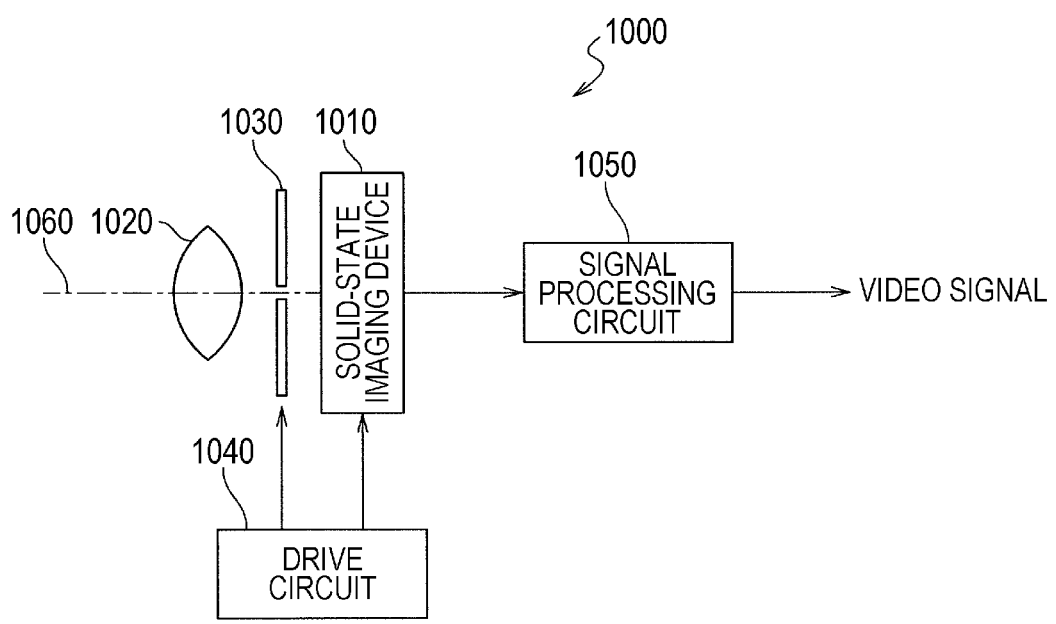
FIG. 34 is a schematic configuration diagram of an electronic apparatus according to a seventh embodiment.

Next, an electronic apparatus according to a seventh embodiment of the present disclosure will be described. FIG. 34 is a schematic configuration diagram of an electronic apparatus 1000 according to the seventh embodiment of the present disclosure.

The electronic apparatus 1000 according to the seventh embodiment includes a solid-state imaging device 1010, an optical lens 1020, a shutter device 1030, a drive circuit 1040, and a signal processing circuit 1050. For the electronic apparatus 1000 according the sixth embodiment, an embodiment of a case where the solid-state imaging device 100 according to the first embodiment of the present disclosure is used, as the solid-state imaging device 1010, for an electronic apparatus (for example, camera) is described.

The optical lens 1020 forms an image of image light (incident light 1060) from a subject on an imaging surface of the solid-state imaging device 1010. Therefore, signal charges are accumulated in the solid-state imaging device 1010 over a certain period. The shutter device 1030 controls a light irradiation period and a light shielding period for the solid-state imaging device 1010. The drive circuit 1040 supplies a drive signal for controlling the transfer operation of the solid-state imaging device 1010 and the shutter operation of the shutter device 1030. A signal of the solid-state imaging device 1010 is transferred in response to the drive signal (timing signal) supplied from the drive circuit 1040. The signal processing circuit 1050 performs various types of signal processing on a signal (pixel signal) output from the solid-state imaging device 1010. A video signal subjected to the signal processing is stored in a storage medium such as a memory or output to a monitor.

In such a configuration, in the electronic apparatus 1000 according to the seventh embodiment, optical color mixing can be suppressed in the solid-state imaging device 1010, and thus the image quality of the video signal can be improved.

Note that the electronic apparatus 1000 to which the solid-state imaging devices 100, 100A, and 100B can be applied is not limited to the camera, and can also be applied to other electronic apparatuses. For example, the solid-state imaging device may be applied to an imaging device such as a camera module for a mobile device such as a mobile phone.

Furthermore, in the seventh embodiment, as the solid-state imaging device 1010, the solid-state imaging devices 100, 100A, 100B, and 100C according to the first to fifth embodiments are used for an electronic apparatus, but other configurations may be used.

Usage Example of Solid-State Imaging Device

The above-described solid-state imaging device can be used, for example, in various cases of sensing light such as visible light, infrared light, ultraviolet light, and X-rays as will be described below.

- A device that captures an image to be used for viewing, such as a digital camera or a portable device with a camera function
- A device used for traffic control, such as an in-vehicle sensor that captures images of the forward side, rearward side, surrounding, inside of an automobile, a monitoring camera that monitors traveling vehicles and roads, and a distance measuring sensor that measures a distance between vehicles, for safe driving such as automatic stop, recognition of a driver's condition, and the like.
- A device used for home electric appliances such as a TV, a refrigerator, and an air conditioner in order to capture an image of a gesture of a user and perform an apparatus operation according to the gesture.
- A device used for medical care or health care, such as an endoscope or a device used for performing angiography by receiving infrared light.
- A device used for security, such as a monitoring camera for crime prevention or a camera for person authentication.
- A device used for beauty care, such as a skin measuring instrument for imaging skin or a microscope for imaging scalp.
- A device used for sports, such as an action camera for sports or a wearable camera for sports.
- A device used for agriculture, such as a camera for monitoring conditions of fields and crops Note that the effects described in the present specification are merely examples and are not limited, and other effects may be provided.

Note that the present disclosure can also have the following configurations.

(1)
A semiconductor device including:
a first semiconductor substrate including a first capacitive element portion including at least one capacitive element;
a second semiconductor substrate stacked with respect to the first semiconductor substrate; and
a second capacitive element portion formed by a metal bonding portion provided on a bonding surface between the first semiconductor substrate and the second semiconductor substrate,
in which the first and second capacitive element portions are connected to each other in parallel.

(2)
The semiconductor device according to (1), in which the second semiconductor substrate includes a third capacitive element portion including at least one capacitive element.

(3)
The semiconductor device according to (2),
in which the first and third capacitive element portions each connect a plurality of capacitive elements in parallel, and
the plurality of capacitive elements includes two or more of a MOS capacitive element, a comb-shaped wiring capacitive element, a metal insulator metal (MIM) capacitive element, and a poly insulator poly (PIP) capacitive element.

(4)

The semiconductor device according to any one of (1) to (3), in which the second capacitive element portion includes a first metal bonding portion and a second metal bonding portion which are formed to be opposed to each other in a direction orthogonal to a stacking direction of the first semiconductor substrate and the second semiconductor substrate.

(5)

The semiconductor device according to (4), in which the first metal bonding portion has a ring shape, and the second metal bonding portion is formed at a center portion of the ring shape.

(6)

The semiconductor device according to (5), in which the first metal bonding portion and the second metal bonding portion include a first metal film provided on a bonding surface of the first semiconductor substrate and a second metal film provided on a bonding surface of the second semiconductor substrate, in the first metal bonding portion, an inner diameter of the first metal film is smaller than an inner diameter of the second metal film, and in the second metal bonding portion, a diameter of the first metal film is smaller than a diameter of the second metal film.

(7)

The semiconductor device according to any one of (4) to (6), in which the first metal bonding portion and the second metal bonding portion have a square structure.

(8)

The semiconductor device according to any one of (1) to (7), in which the first semiconductor substrate includes at least one of a pixel and a peripheral circuit that processes a signal from a pixel transistor amplifying a signal from the pixel, and the second semiconductor substrate includes the other one of the pixel and the peripheral circuit.

(9)

The semiconductor device according to (8), in which the pixel includes a photodiode, and a third semiconductor substrate including the pixel transistor is further stacked at least one of on the first semiconductor substrate and the second semiconductor substrate, and between the first semiconductor substrate and the second semiconductor substrate.

(10)

The semiconductor device according to any one of (1) to (7), in which the first semiconductor substrate includes at least one of a sensor unit including a single photon avalanche diode (SPAD) photodiode and a peripheral circuit that processes a signal from the sensor unit, and the second semiconductor substrate includes the other one of the sensor unit and the peripheral circuit.

(11)

The semiconductor device according to any one of (1) to (10), in which the third capacitive element portion includes an in-pixel capacitor.

(12)

An electronic apparatus including a semiconductor device, the semiconductor device including:

a first semiconductor substrate including a first capacitive element portion including at least one capacitive element;

a second semiconductor substrate stacked with respect to the first semiconductor substrate; and a second capacitive element portion formed by a metal bonding portion provided on a bonding surface between the first semiconductor substrate and the second semiconductor substrate, in which the first and second capacitive element portions are connected to each other in parallel.

REFERENCE SIGNS LIST

30 Pixel
31 Photodiode
32, 228, 621 p-type well
33a, 33b, 33c, 311 Element separation portion
35, 42b n-type diffusion layer
36 Gate electrode
41 SPAD photodiode
42a p-type diffusion layer
51 Peripheral circuit
100, 110A, 100B, 100C Solid-state imaging device
110 Pixel array unit
120 Row selection circuit
130 Horizontal transfer scanning circuit
140 Timing control circuit
150 ADC group
151 Comparator
152 Counter
153 Latch
170 Amplifier circuit
180 Signal processing circuit
190 Horizontal transfer line
210, 710 Upper semiconductor substrate
211, 711 Photoelectric conversion layer
213, 221, 713, 721 Inter-layer insulating film
214, 222, 622, 714, 722 Wiring layer
215, 223, 623, 631, 632, 715, 723, 724 Wiring
220, 720 Lower semiconductor substrate
225, 226 Terminal
230, 510, 520, 530, 730 Bonding portion capacitive element
231, 232, 511, 512, 640, 641, 642, 731, 732 Metal bonding portion
234, 313, 321, 331, 343, 413, 421, 514 Upper electrode
235, 312, 322, 332, 342, 412, 422, 515 Lower electrode
310, 410 Accumulation type MOS capacitive element
314, 315, 414, 415 Via
316, 416 Gate insulating film
320 MIM capacitive element
330 MOM capacitive element
340 PIP capacitive element
420 MOM capacitive element
521, 523, 531, 533 First metal film
522, 524, 532, 534 Second metal film
525, 535 First electrode
526, 536 Second electrode
610 Sensor unit
611 Photoelectric conversion layer
612 Inter-layer insulating film
620 pixel transistor unit
630 Peripheral circuit unit
800 Operational amplifier
1000 Electronic apparatus
1010 Solid-state imaging device 1020 Optical lens
1030 Shutter device
1040 Drive circuit
1050 Signal processing circuit
1060 Incident light

The invention claimed is:

1. A semiconductor device, comprising:
a first semiconductor substrate including a first capacitive element portion, wherein the first capacitive element portion includes at least one capacitive element;
a second semiconductor substrate on the first semiconductor substrate; and
a second capacitive element portion that includes a metal bonding portion on a bonding surface between the first semiconductor substrate and the second semiconductor substrate, wherein
the second semiconductor substrate includes a third capacitive element portion,
the third capacitive element portion includes a first plurality of capacitive elements connected in parallel,
the first capacitive element portion is connected in parallel to the second capacitive element portion, and
the second capacitive element portion is connected in parallel to the third capacitive element portion.

2. The semiconductor device according to claim 1, wherein
the first capacitive element portion connects a second plurality of capacitive elements in parallel, and
the first plurality of capacitive elements and the second plurality of capacitive elements include at least two of a MOS capacitive element, a comb-shaped wiring capacitive element, a metal insulator metal (MIM) capacitive element, or a poly insulator poly (PIP) capacitive element.

3. The semiconductor device according to claim 1, wherein
the metal bonding portion of the second capacitive element portion includes a first metal bonding portion and a second metal bonding portion, and
the first metal bonding portion is opposite to the second metal bonding portion in a direction orthogonal to a stacking direction of the first semiconductor substrate and the second semiconductor substrate.

4. The semiconductor device according to claim 3, wherein
the first metal bonding portion has a ring shape, and
the second metal bonding portion is at a center portion of the ring shape.

5. The semiconductor device according to claim 4, wherein
the first metal bonding portion and the second metal bonding portion include:
a first metal film on a bonding surface of the first semiconductor substrate, and
a second metal film on a bonding surface of the second semiconductor substrate,
in the first metal bonding portion, an inner diameter of the first metal film is smaller than an inner diameter of the second metal film, and
in the second metal bonding portion, a diameter of the first metal film is smaller than a diameter of the second metal film.

6. The semiconductor device according to claim 3, wherein the first metal bonding portion and the second metal bonding portion have a square structure.

7. The semiconductor device according to claim 1, further comprising a pixel transistor, wherein
the first semiconductor substrate includes at least one of:
a pixel, or
a peripheral circuit configured to process a signal from the pixel transistor, wherein the pixel transistor is configured to amplify a signal from the pixel, and
the second semiconductor substrate includes other one of the at least one of the pixel or the peripheral circuit.

8. The semiconductor device according to claim 7, further comprising a third semiconductor substrate at least one of:
on the first semiconductor substrate and the second semiconductor substrate, or
between the first semiconductor substrate and the second semiconductor substrate, wherein
the pixel includes a photodiode, and
the third semiconductor substrate includes the pixel transistor.

9. The semiconductor device according to claim 1, wherein
the first semiconductor substrate further includes at least one of:
a sensor unit including a single photon avalanche diode (SPAD) photodiode, or
a peripheral circuit configured to process a signal from the sensor unit, and
the second semiconductor substrate further includes other of the at least one of the sensor unit or the peripheral circuit.

10. The semiconductor device according to claim 1, wherein the second capacitive element portion further includes an in-pixel capacitor.

11. An electronic apparatus, comprising:
a semiconductor device that includes:
a first semiconductor substrate including a first capacitive element portion, wherein the first capacitive element portion includes at least one capacitive element;
a second semiconductor substrate on the first semiconductor substrate; and
a second capacitive element portion that includes a metal bonding portion on a bonding surface between the first semiconductor substrate and the second semiconductor substrate, wherein
the second semiconductor substrate includes a third capacitive element portion,
the third capacitive element portion includes a first plurality of capacitive elements connected in parallel,
the first capacitive element portion is connected in parallel to the second capacitive element portion, and
the second capacitive element portion is connected in parallel to the third capacitive element portion.

12. A semiconductor device, comprising:
a pixel transistor;
a first semiconductor substrate that includes:
a first capacitive element portion that includes at least one capacitive element, and
at least one of:
a pixel, or
a peripheral circuit configured to process a signal from the pixel transistor, wherein the pixel transistor is configured to amplify a signal from the pixel;
a second semiconductor substrate on the first semiconductor substrate, wherein the second semiconductor substrate includes other one of the at least one of the pixel or the peripheral circuit; and a second capacitive element portion that includes a metal bonding portion on a bonding surface between the first semiconductor substrate and the second semiconductor substrate, wherein the first capacitive element portion is connected in parallel to the second capacitive element portion.

* * * * *